US012098806B2

(12) United States Patent
Kubista et al.

(10) Patent No.: US 12,098,806 B2
(45) Date of Patent: Sep. 24, 2024

(54) MODULAR AND PORTABLE COMPRESSED NATURAL GAS FUELING STATION

(71) Applicant: TruStar Energy LLC, Oronoco, MN (US)

(72) Inventors: Daniel Kubista, St. Charles, MN (US); Corey Sense, St. Charles, MN (US); Chad Starkson, Kenyon, MN (US)

(73) Assignee: OPAL FUELS, LLC, White Plains, NY (US)

(*) Notice: Subject to any disclaimer, the term of this patent is extended or adjusted under 35 U.S.C. 154(b) by 0 days.

(21) Appl. No.: 17/888,608

(22) Filed: Aug. 16, 2022

(65) Prior Publication Data

US 2022/0390070 A1 Dec. 8, 2022

Related U.S. Application Data

(63) Continuation of application No. 16/884,996, filed on May 27, 2020, now Pat. No. 11,415,268.

(51) Int. Cl.
*F17C 7/02* (2006.01)

(52) U.S. Cl.
CPC ........ *F17C 7/02* (2013.01); *F17C 2205/0338* (2013.01); *F17C 2221/033* (2013.01); *F17C 2227/0157* (2013.01); *F17C 2227/0309* (2013.01); *F17C 2250/032* (2013.01); *F17C 2250/0636* (2013.01); *F17C 2270/0171* (2013.01)

(58) Field of Classification Search
CPC ................ F17C 7/02; F17C 2205/0338; F17C 2221/033; F17C 2227/0157; F17C 2227/0309; F17C 2250/032; F17C 2250/0636; F17C 2270/0171
See application file for complete search history.

(56) References Cited

U.S. PATENT DOCUMENTS

| | | | | |
|---|---|---|---|---|
| 9,482,338 | B2 | 11/2016 | Murphy | |
| 2007/0100178 | A1* | 5/2007 | Carstens | C01B 3/001 422/198 |
| 2009/0071565 | A1 | 3/2009 | Ding | |
| 2013/0284286 | A1 | 10/2013 | Edelbach et al. | |

(Continued)

OTHER PUBLICATIONS

International Preliminary Report on Patentability dated Dec. 8, 2022 from corresponding International Patent Application No. PCT/US2021/034319, 8 pages.

(Continued)

*Primary Examiner* — Jason K Niesz
(74) *Attorney, Agent, or Firm* — Ruggiero McAllister & McMahon LLC

(57) ABSTRACT

Systems and methods are provided for a modular compressed natural gas (CNG) fueling station. The modular CNG fueling station modules include a control station skid, an interface module, and a compressor skid. The compressor skid includes a fueling station for fueling a compressed natural gas (CNG) vehicle. Each of the modules of the modular CNG fueling station are configured as fully wired "plug and play" station modules. The control station module, the interface module, and the compressor module are each pre-plumbed with electrical connections to allow the CFS station to be portable and easily installed above-ground at a utility site.

21 Claims, 24 Drawing Sheets

(56) References Cited

U.S. PATENT DOCUMENTS

| | | | | |
|---|---|---|---|---|
| 2015/0059863 | A1* | 3/2015 | Barbato | F17C 5/06 137/259 |
| 2016/0178127 | A1 | 6/2016 | Oh et al. | |
| 2018/0347762 | A1 | 12/2018 | Tomlinson | |

OTHER PUBLICATIONS

International Search Report dated Sep. 8, 2021 from corresponding International Patent Application No. PCT/US2021/034319, 3 pages.
International Search Report dated Sep. 8, 2021 from corresponding International Patent Application No. PCT/US2021/034319, 10 pages.

* cited by examiner

FEATURES:

1. TOTAL WEIGHT 43,000 LBS. (COMPRESSOR SKID 33,000 LBS. AND CONTROL SKID 10,000 LBS.)
2. REQUIRES 10FT. SPREADER BAR FOR LIFTING.
3. REQUIRES 3 PHASE 480V AND 600A SERVICE.
4. 600A MANUAL TRANSFER SWITCH WITH GENERATOR HOOKUPS.
5. MOTOR CONTROL PANEL RATED TO 333FLA.
6. 75KVA UTILITY TRANSFORMER WITH 100A LOAD CENTER. 50A AVAILABLE FOR OPTIONS.

101
112
109
102
2 PCS. 2" CONDUIT TO TRUSS BLOCK HEATERS
103
5 PCS. 1" CONDUIT TO TRUSS LIGHTING
104
GROUND CONNECTION ONE ONE EACH CORNER OF THE CONTROL SKID
140
106
3 PCS. 1" CONDUIT FOR ESD CIRCUIT
GROUND CONNECTION ONE ONE EACH CORNER OF THE COMPRESSOR SKID
115
124
111
105
125
107
108
6 PCS. 2" CONDUIT FOR DCI COMMUNICATION 101
140
204
204
204
202
198
196
194
192
142
143
143
144
180
191
190
134
135
145
107
36.00
30.00
30.00
30.00
36.00
36.00
48.00
48.00
30.00
480V MTS.
480V MTS
WAN/DCS COMMUNICATIONS
120V CONTROLS
480V MOTOR STARTER
480/208/120V 75KVA TRANSFORMER
480V C1 DIV2 EXHAUST FAN
208Y/120V 100A LOAD CENTER
208V 100A DISCONNECT TRUSS 2
208V 100A DISCONNECT TRUSS 1
480V 100A FUSED DISCONNECT FOR TRANSFORMER

MODULAR AND PORTABLE COMPRESSED NATURAL GAS FUELING STATION

CROSS REFERENCE TO RELATED APPLICATIONS

This application is a continuation U.S. patent application of U.S. patent application Ser. No. 16/884,996, having the same title and filed on May 27, 2020, the entirety of which is incorporated herein by reference.

DESCRIPTION OF RELATED ART

Field of the Disclosure

The present disclosure relates to a compressed natural gas fueling station.

Description of Related Art

Conventional compressed natural gas (CNG) fueling stations for CNG vehicles and tanks require separate on-site installation and custom, underground wiring to operate. Compressor, truss lighting, heaters and other devices and systems for CNG fueling stations require additional amperage to power the devices. This requires bespoke in-ground electric wiring to separate, on-site power sources to run the higher voltage devices.

In conventional compressor systems for CNG stations, I/O compressor boards are mounted on the back of a controller, which is housed in a separate location from the compressors. Accordingly, signal wiring and electronic wiring for each compressor are run to the I/O compressor boards mounted on the back of the controller. Thus, in a conventional compressor installation, this can require up to 7-8 electrical conduits per compressor, and 20 or more electrical conduits total, distributed throughout the installation to the controller—over a mile of wiring.

In short, conventional CNG fueling stations are built as permanent installations at sites. Structures, systems and electronics are custom built and installed as a permanent station. There has been no conception of a portable, all-in-one "plug-and-play" CNG fueling station.

SUMMARY

Disclosed are embodiments of systems and methods for a portable, modular CNG fueling station. In an embodiment, the modular compressed natural gas (CNG) fueling station comprises a compressor module configured to house a CNG compressor unit for the CNG fueling station. The compressor module comprises a compressor module connection interface component. The CNG fueling station also comprises a control module comprising a control module connection interface component. The CNG fueling station also comprises an interface module that comprises electrical conduits connecting the compressor module connection interface component to the control module connection interface component to operatively connect the compressor module to the control module. The CNG fueling station also includes a fueling station module comprising a utility gas inlet operatively connected to the compressor module. The CNG fueling station also comprises a priority panel configured to control compressed natural gas flow for the fueling station module. The CNG fueling station module includes fueling inlets and outlets that can be connected on either side of the CNG station. The modular CNG fueling station is configured with preinstalled electrical conduits and valving.

The connection interface of the control module, the interface module, and the connection interface of the compressor module are configured to be installed and connected above-ground on a site. The interface module includes an electrically insulated casing enclosing the electrical conduits connecting the compressor module connection interface component to the control module connection interface. The casing is adapted and safety rated to allow the electrical conduits to operate above-ground. When the control module is connected to a power source and the fueling station module is connected to a CNG fueling source, the station is fully operational.

The CNG station includes housing having an open floor plan with electrical conduits in a sub floor. The housing of the compressor module is configured to improve cooling, heating and prevent water intrusion. The CNG station also includes modular, removable compressor units. Each compressor and its electrical and plumbing components are configured to be installed and removed as a single module, and each compressor can run independently of the others. This allows for easy installation and deinstallation of the compressors as well as easy service.

Remote I/O, transducers and digital outs to relays are controlled by "smart block" I/O compressor boards. The compressor boards are mounted on the compressor panel in the compressor module. Accordingly, only a single control signal line needs to be run from a controller in the control module to the compressor boards.

The control station module is configured with a transformer configured to provide a plurality of different voltages from a power source to differently powered devices of the modular CNG fueling station.

In an embodiment, the fueling station module is configured to provide defueling of CNG vehicles. The compressor module can include a defuel priority panel is configured to defuel a CNG vehicle. The defuel and priority panel is also configured to store defueled gas in defuel storage tanks, which can then be used to later fuel or refuel CNG vehicles and CNG vessels. In an embodiment, the defuel priority panel can direct the defueled to fuel other CNG vehicles at the panel fueling and defueling site. Storage tanks can be provided directly on the compressor module at the fueling station module.

BRIEF DESCRIPTION OF THE DRAWINGS

Embodiments are illustrated in the figures of the accompanying drawings, which are meant to be exemplary and not limiting, and in which like references are intended to refer to like or corresponding things.

DETAILED DESCRIPTION OF EMBODIMENTS

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the disclosure.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references.

Embodiments disclosed herein provide a system, devices, and methods for a modular CNG fueling station.

Figure 1A:
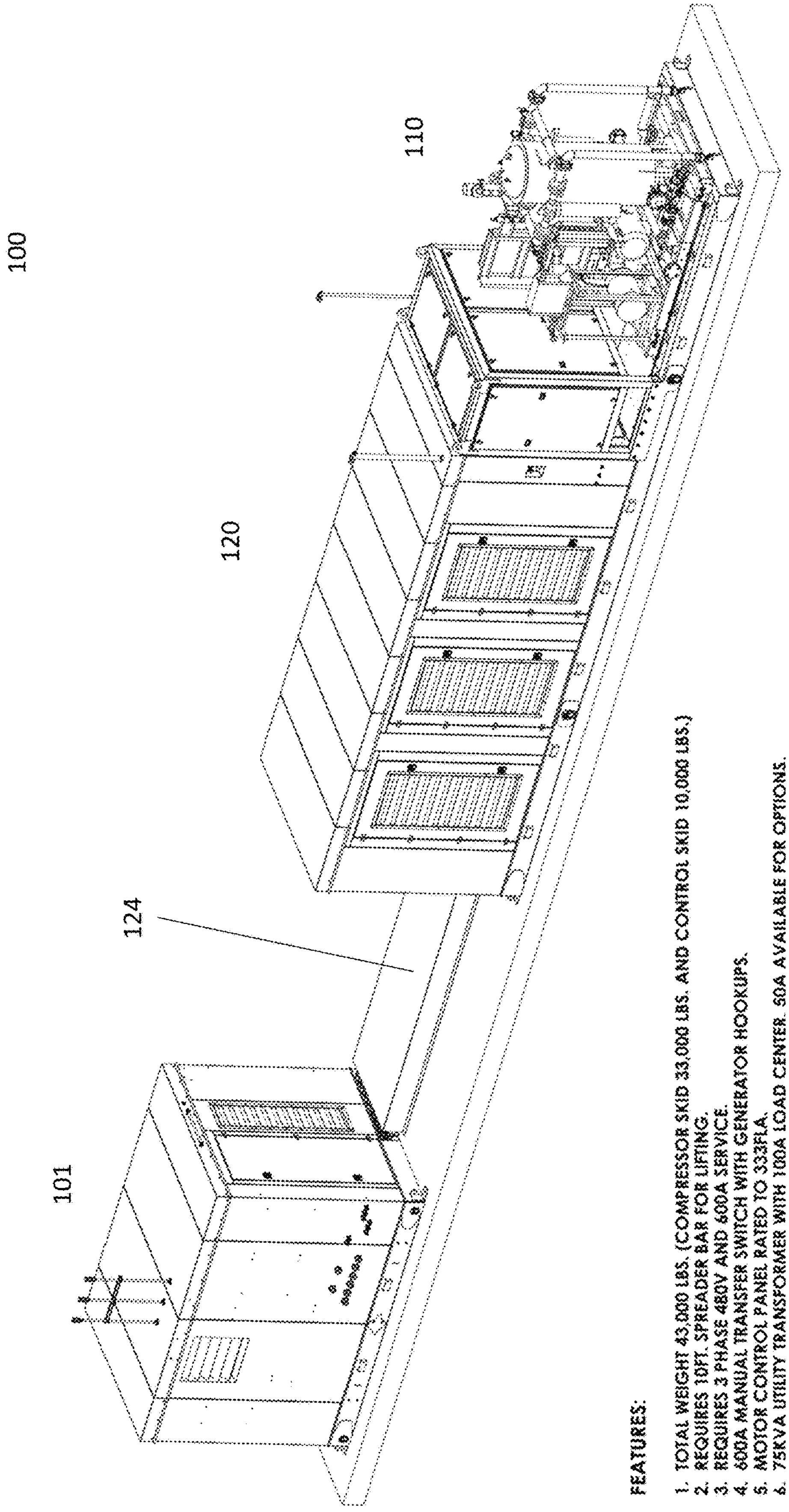
FIGS. 1A-1C shows an embodiment of a modular CNG station.
Figure 1B:
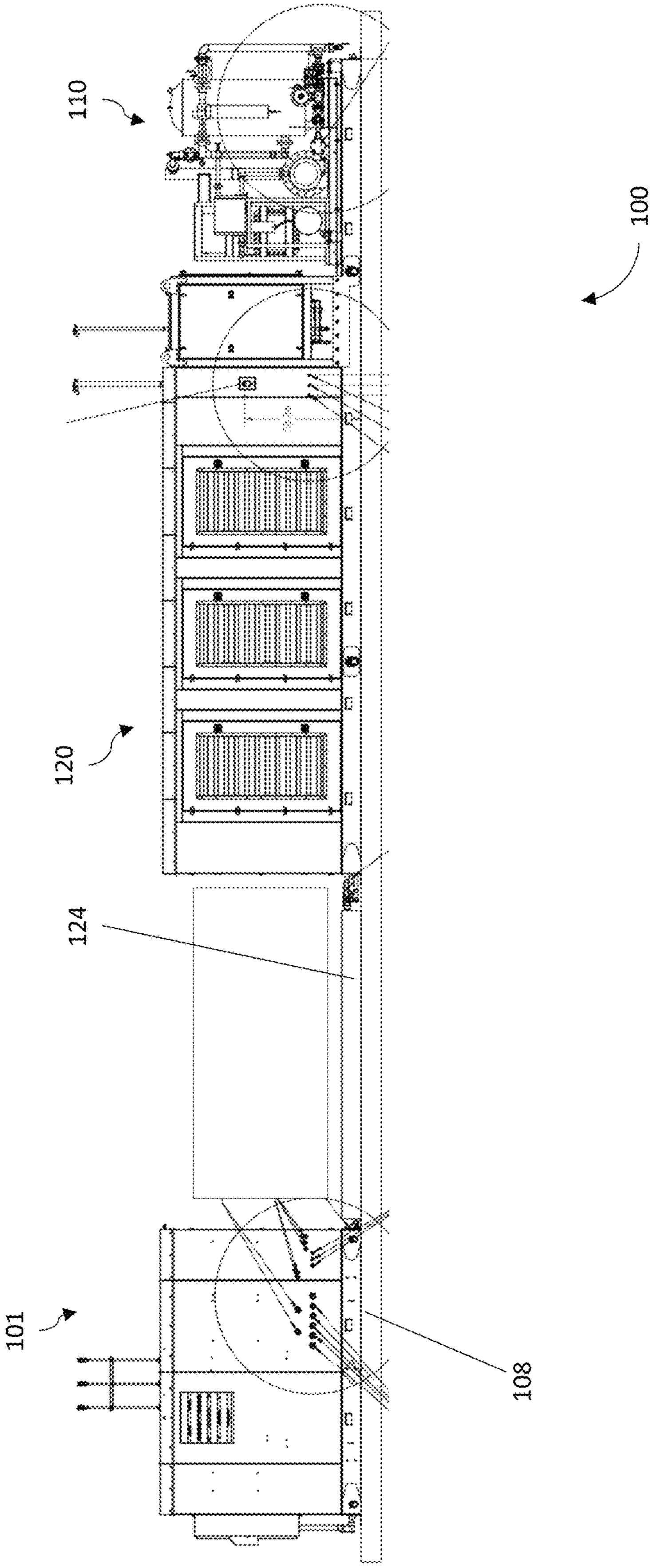
Figure 1C:
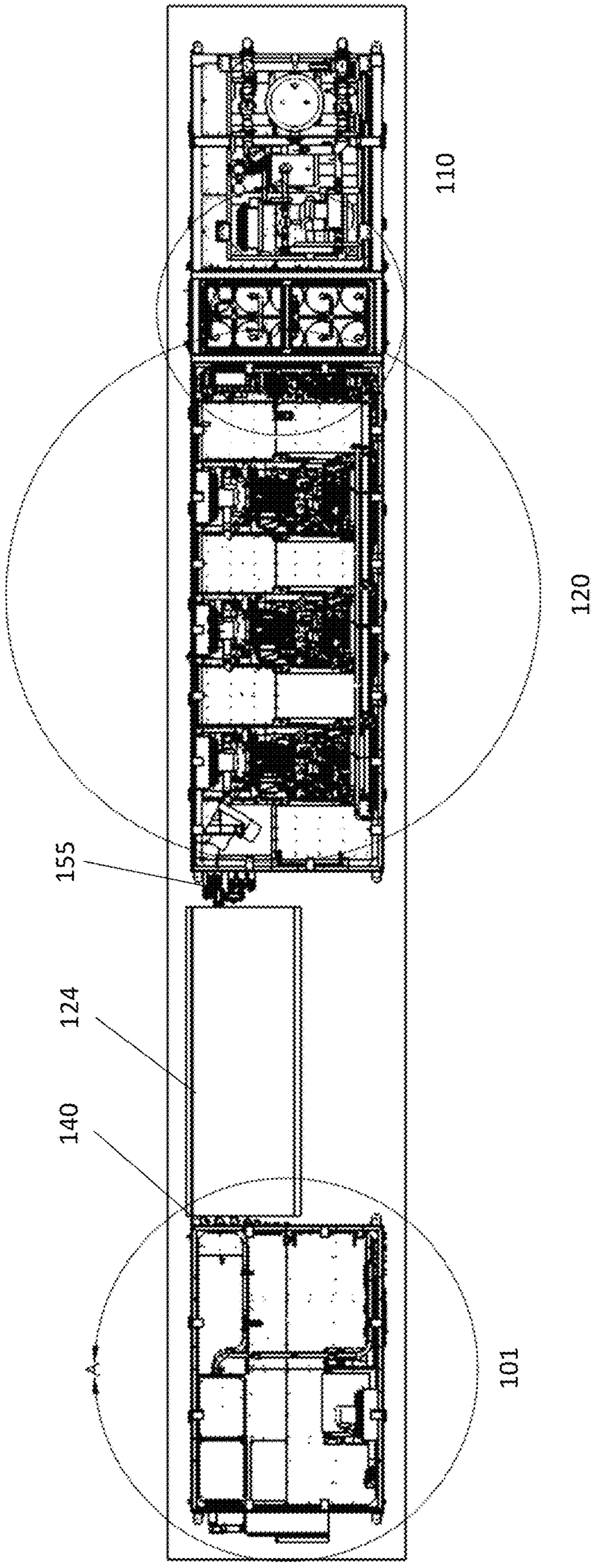

FIGS. 1A-1C show an embodiment of a modular CNG station 100. FIGS. 1A-1B respectively show a three-quarter perspective view and side view of the CNG station 100. FIG. 1C shows a cutaway top plan view of the CNG station 100. The modular CNG station 100 comprises a control station module 101, an interface module 124, a compressor module 120 and a fueling station module 110. Each of the modules of the CNG station 100 are set on a platform 108, which allows the CNG station 100 to be readily placed on an open site or lot for the CNG station 100.

The CNG station 100 is configured to have a length, height and weight to allow it to be easily moved and transported on a standard semi-tractor-trailer truck or transport truck without the need for special permitting. For example, in the embodiment, the CNG station has a weight of about 43,000 pounds, with the compressor module 120 weighing about 33,000 pounds and the control station module 101 weighing about 10,000 pounds. The CNG station 100 is also outfitted with components for easy lifting and placement, such as a 10 foot spreader bar and lifting lugs 111.

Figure 2A:
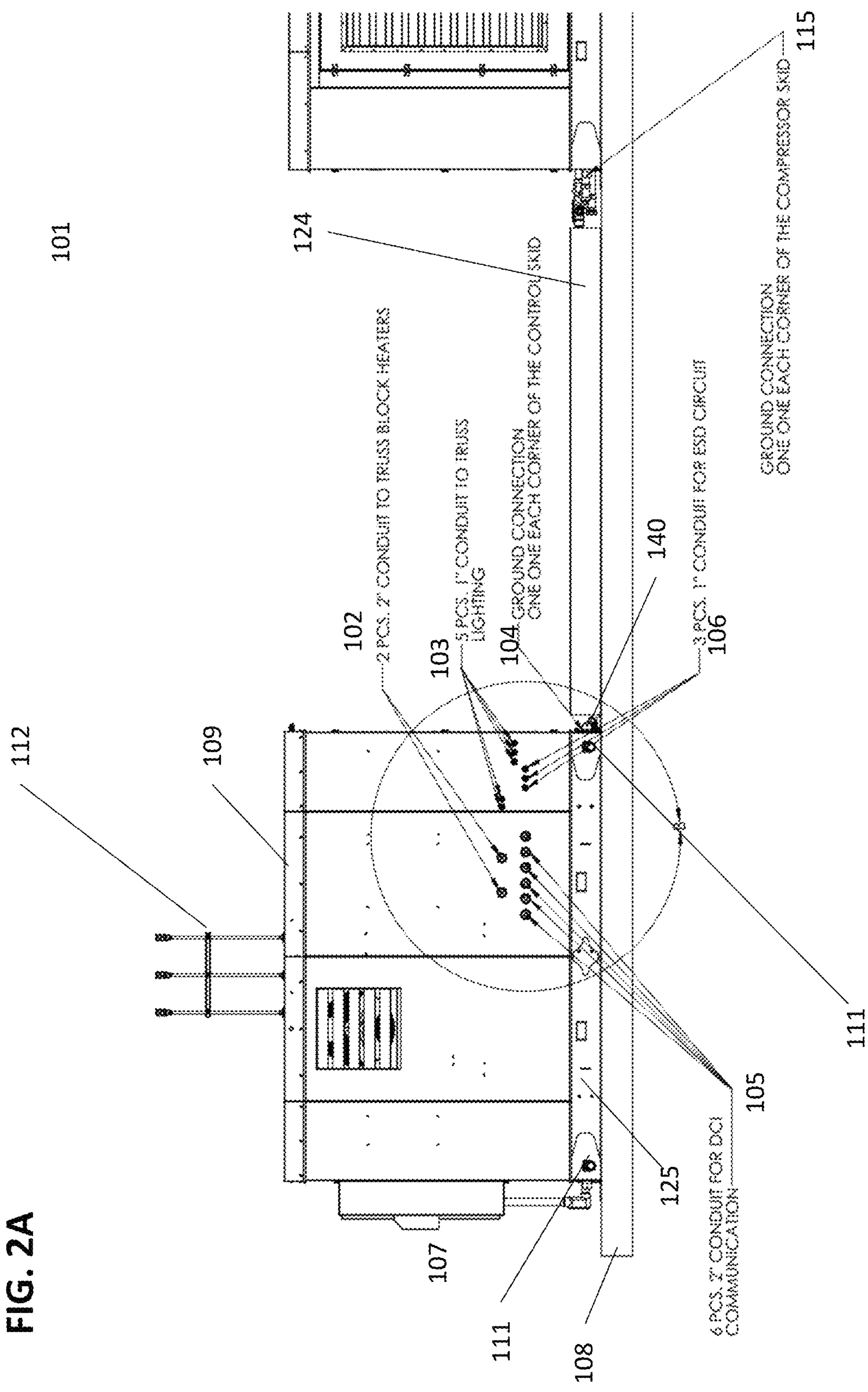
FIG. 2A illustrates a side view of the control station module and the interface module of FIGS. 1A-1B.
Figure 2C:
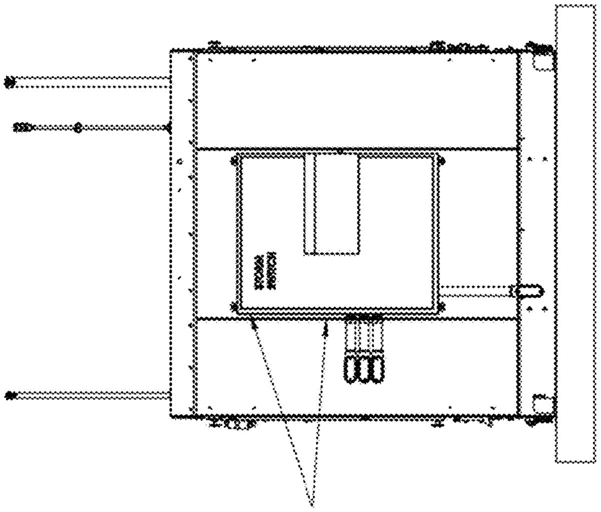
FIG. 2C shows a rear side view of the control station module.
Figure 2B:
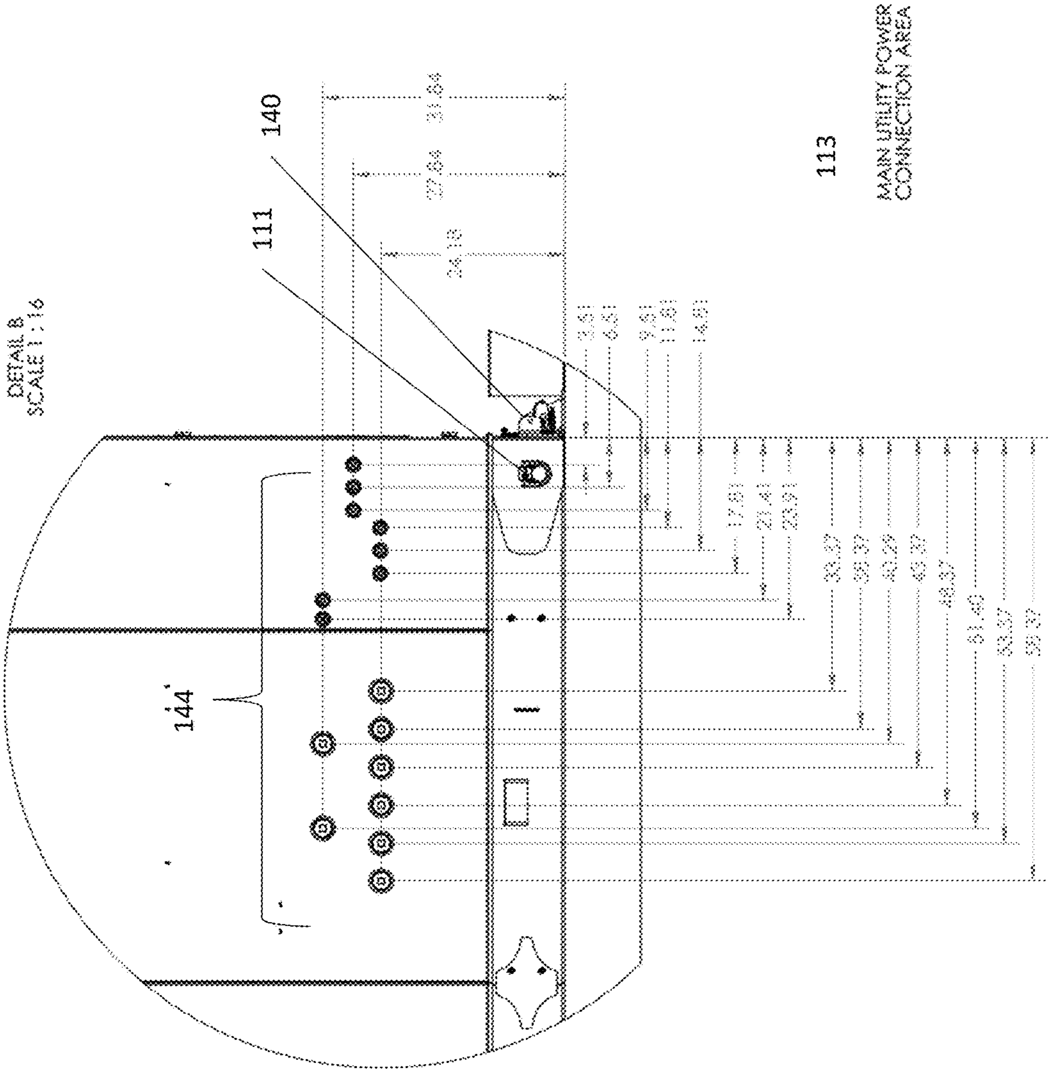
FIG. 2B shows a close up cut-away section from FIG. 2A.

FIG. 2A illustrates a side view of the control station module 101 and the interface module 124 of FIGS. 1A-1B. FIG. 2B shows a close up cut-away section from FIG. 2A, and FIG. 2C shows a rear side view of the control station module 110. The control station module 110 compromises a control room 109, a power source 107, and risers 125 on each side under the bottom of the control room 109. The risers 125 are set on the platform 108. The risers 125 include lifting lugs 111 at each corner of the control station module to allow a crane or other lifting mechanism to easily lift and place the control module on the platform 108 or onto a truck. The control station module 101 includes ground connection components 104 for fixing the control station module 110 to the platform 108. In an embodiment, the control station module 101 includes 4 ground connection components 104 at each corner of the bottom of the control station module 101. The power source 107 includes a connection area 113 for a power connection to a utility station and configured for 480 volts/600 amps. Power source 107 can be configured as a manual transfer switch, for example, to switch from utility station power to generator power. Power source 107 in the control station module 101 powers the CFS station 100 and external devices.

In an embodiment, the modular CNG station 100 can also run from a generator. The exterior of the control room 109 comprises external connectors 144 to connect to external devices. The external connectors 144 includes sockets 102 for conduits to site heaters, for example truss block heaters, and sockets 103 for lighting, for example truss lighting. The control room's 109 external connectors 144 also includes sockets 105 for DCI communication connections and sockets 106 for ESD circuits. The control station module 101 is thereby provided with external connectors 144 for powering external devices for the CNG station 100 environment, such as lighting and heating. The control station module 101 also includes an antenna 112 for wireless communication with the compressor module 120.

Figure 3A:
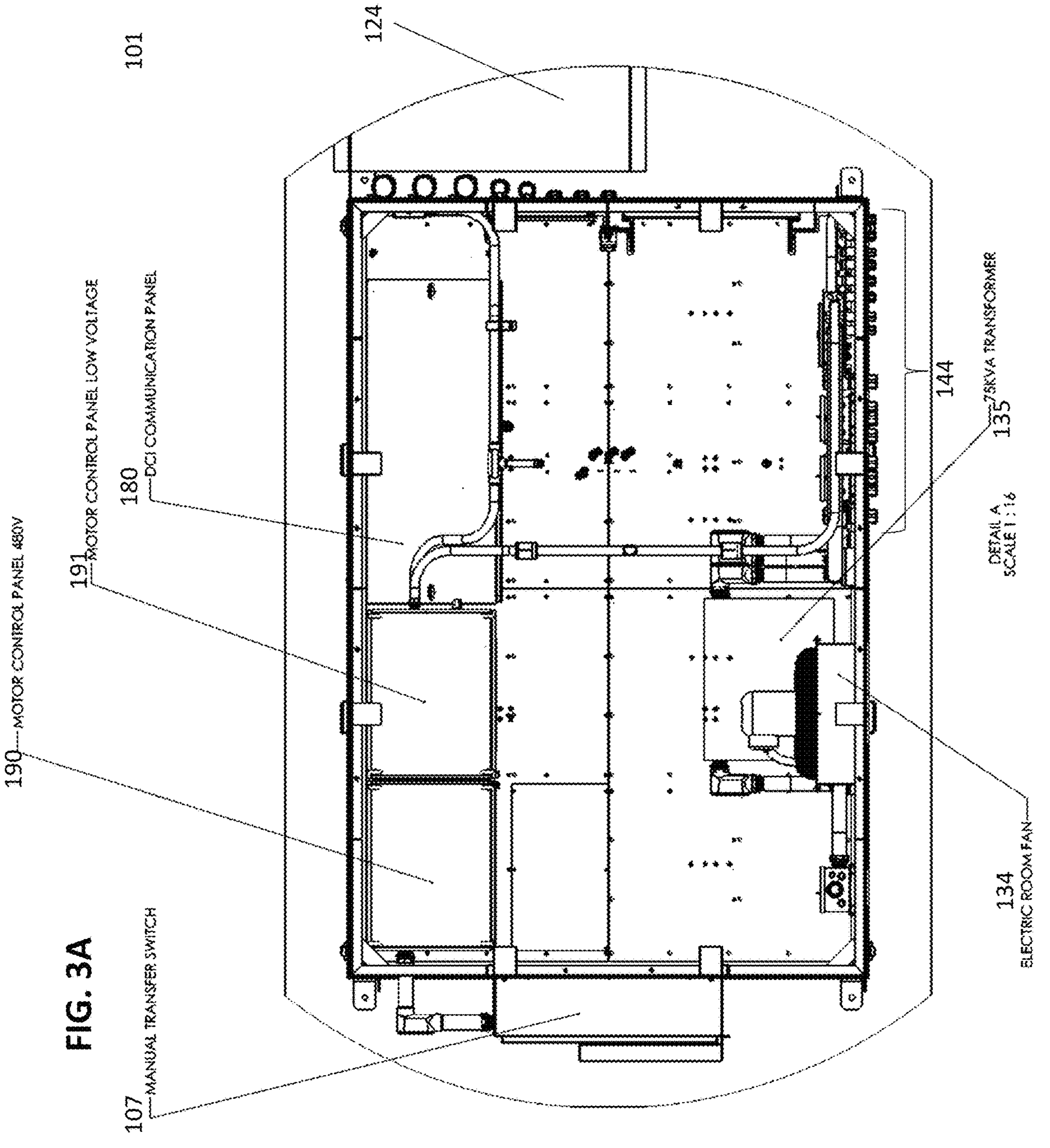
FIGS. 3A-3B show plan views of the control station module.
Figure 3B:
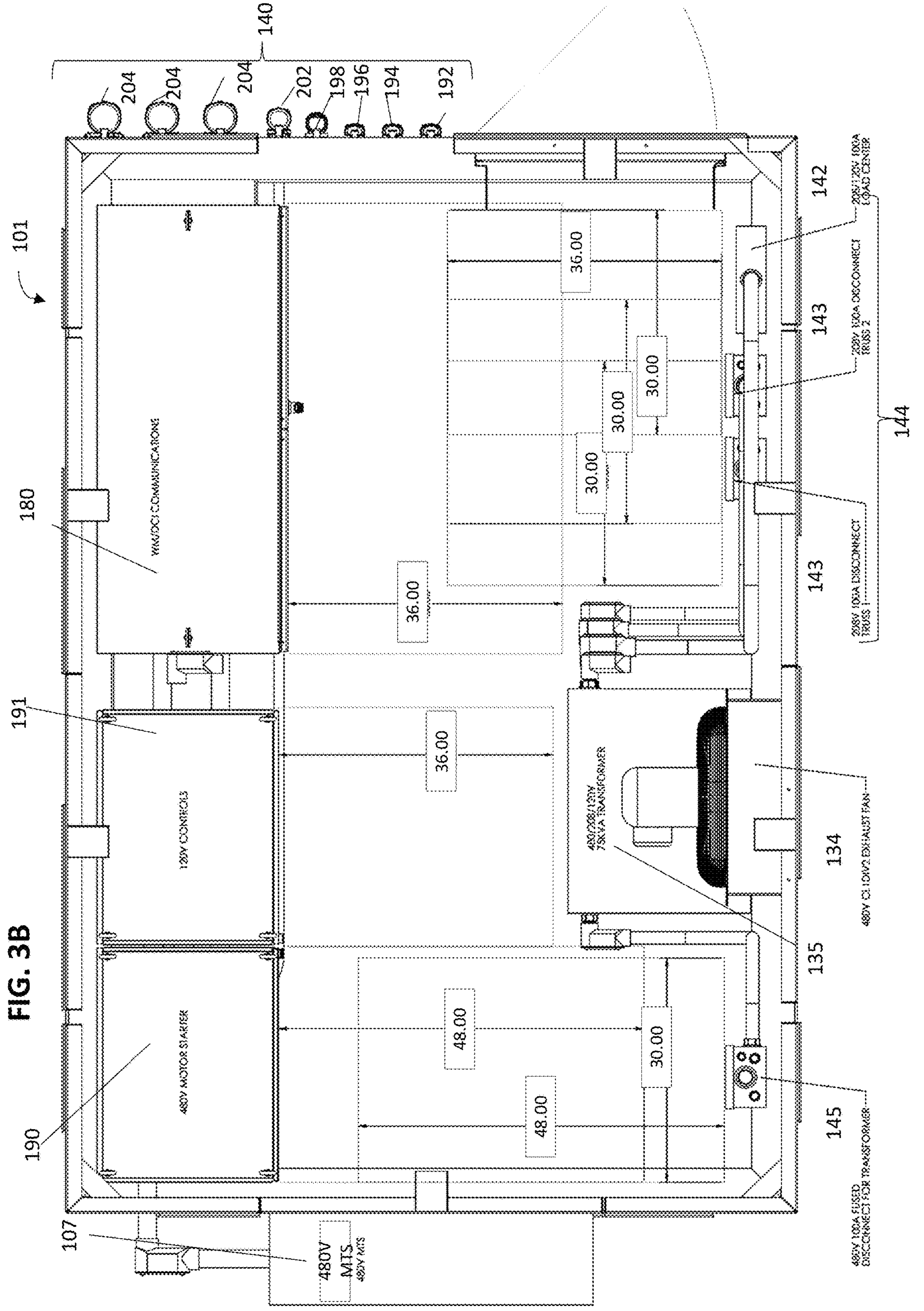

FIGS. 3A-3B show plan views of the control station module 101. The control station module 101 comprises a high voltage control power panel 190, shown as 480 v control power panel 190. One exemplary advantage of the CNG station 100 is that the control station module 101 has been configured to add 200 amps of additional power to power, inter alia, external devices such as lighting trusses and area heaters for the CNG station 100 site as described above. The site's power is comparable to stationary lighting trusses of a conventional, permanent CNG fueling station. To explain, truss systems and lighting systems conventionally need additional amperage to power the devices. As described herein, the control station module 101 system incorporates additional amperage into control room 109. As such, the modular CNG station 100 can be installed without the need to trench in electric cables in-ground. The modular CNG station 100 is thus made portable and does not require permanent construction or in-ground, distributed electrical installations. As explained herein, the modular CNG station 100 can be placed on an empty site at the utility, for example a parking lot, to provide a fully functional fueling station for fueling vehicles, complete with external lighting and heating.

In an embodiment, as shown in FIG. 3B, the control room 109 of control station module 101 is designed with at least minimum clearances to meet code standards for an electric control room 109. For example, the control room 109 can have an 8'×12' footprint and is thus portable while still meeting NEC code standards.

Figure 4A:
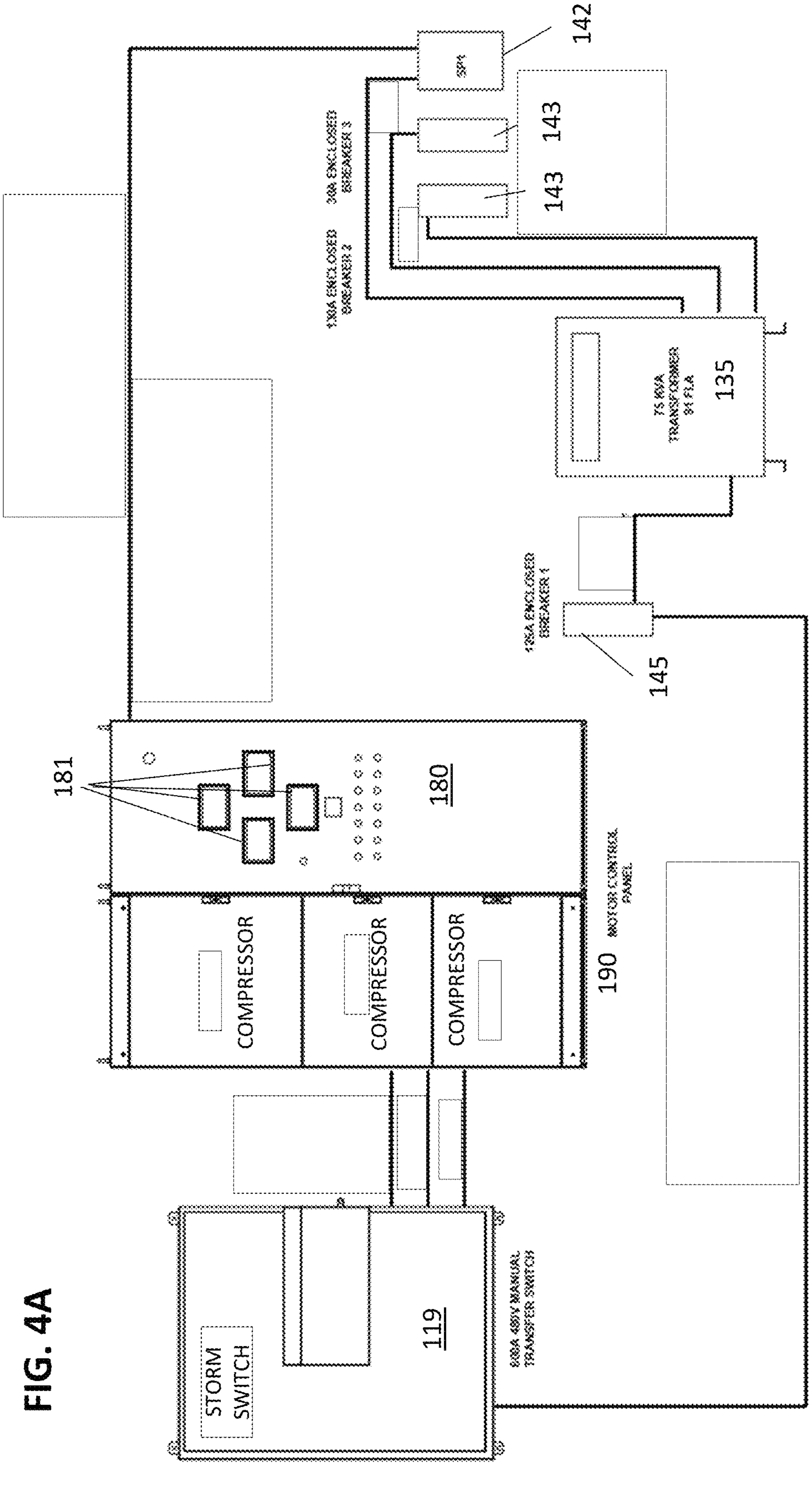
FIGS. 4A-4C show an embodiment of a wiring diagram for a control module control panel and interfaces with a compressor module control board.
Figure 4B:
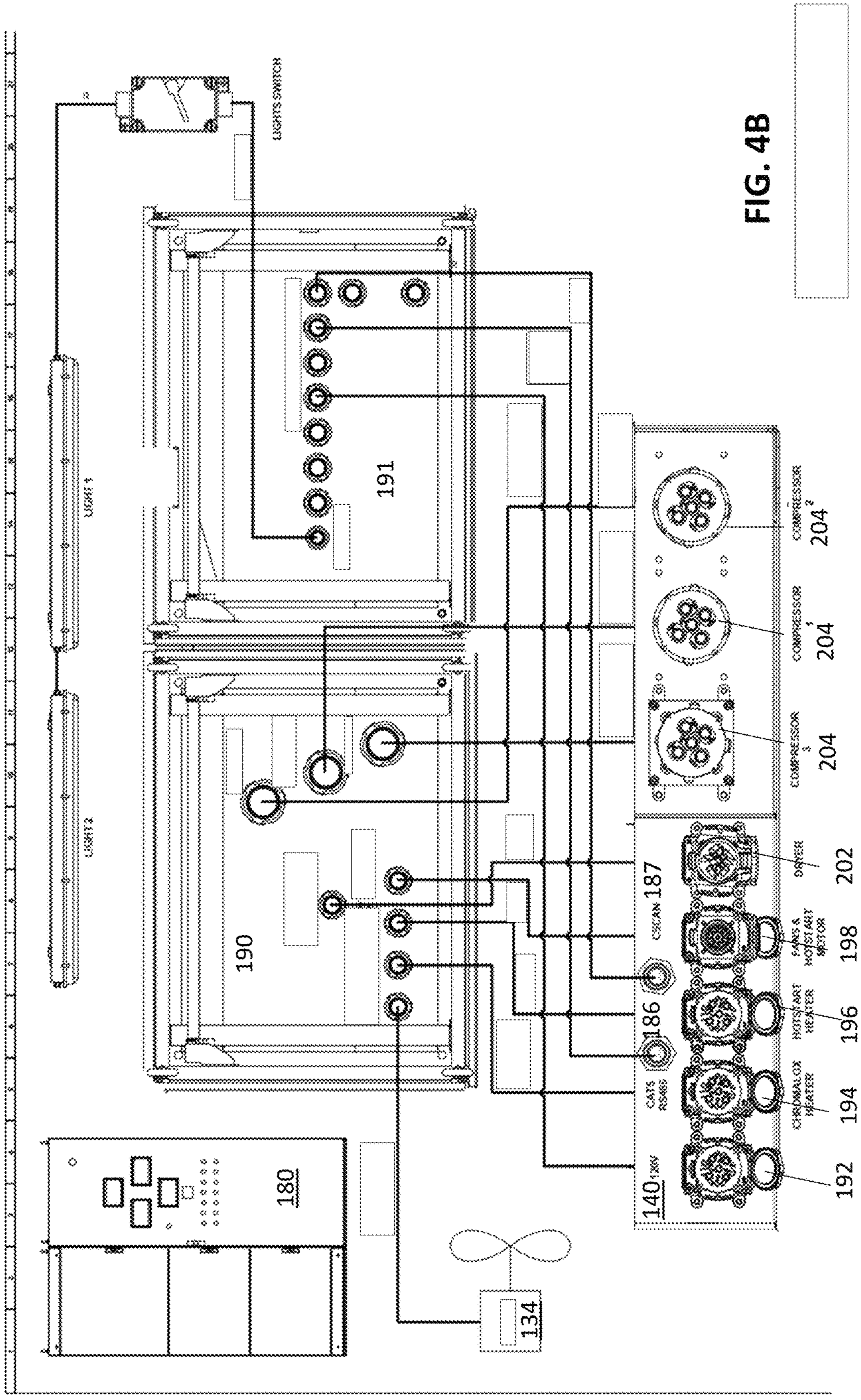
Figure 4C:
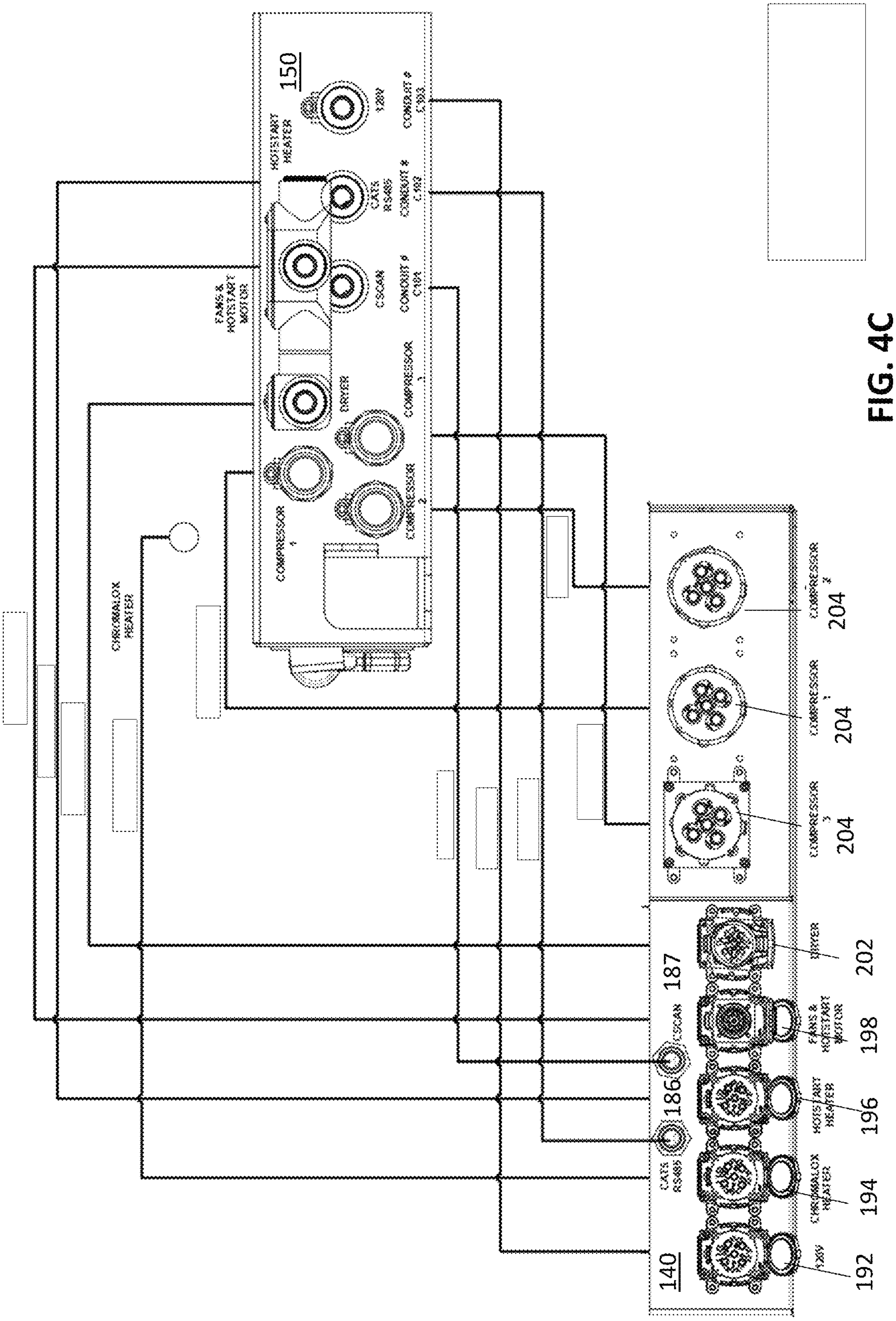

FIGS. 4A-4C show an embodiment of a fully wired "plug and play" wiring diagram for the portable CFS control module control panel 180 and interfaces with a compressor module 120 compressor board 150. Conventional systems would require a separate on-site installation and custom, underground wiring to run a compressor. The present system, however, provides pre-wired inputs for a 120 volt power source 192, a compressor heater 137, a defuel system heater 164, fans 134 for cooling compressors 136, a dryer 211, and compressors 136. By pre-fabricating the wiring from the control module to the interface module, and in turn encasing wiring in in the interface module 124 and in a sub floor 130 of the compressor module 120, the CFS is portable, and does not require permanent installation.

FIGS. 4A-4B shows the power source's switch 119 feeds for the DCI control panel 180 and the transformer 135. The transformer 135 is configured to step up the power by an additional 200 volts. This allows for lighting and heating of the fueling area for fueling and defueling. As shown in FIG. 4A, the compressors 136, fans, and all high load devices run on 480 volts from the switch 119 to the compressors 136 and at 125A breaker 145. Each compressor 136 has its own independent conduit, as each compressor 136 can be run independently of the other compressors when there is a plurality of compressors at the compressor module 120. This voltage is stepped down by transformer 135 to 200 volts at breakers 143 for external devices such as truss lighting and block heaters. The system electricity is then stepped down again from transformer 135 to 120 volts at breaker 142 for control panel 180, control room lighting 146, 120V low voltage control 191 and other low voltage controls and interfaces. The control panel 180 includes controls 181 and a control program to run the CFS station's 100 fueling station module 110, compressor module 120, heaters, and fans from a master controller and 3 sub-controllers.

The control station module 101 is configured to operate the compressor and fueling functions. As shown in FIGS. 4B-4C, the 480 voltage power panel 190 is wired to "quick connect" to external outlets of a connection interface 140 of the control room 109 of the control station module 101. At the connection interface 140, each compressor has its own independent conduit socket 204, which is configured for quick connection to the compressor module 120. In an embodiment, as shown in FIG. 4B, the 480 volt power control 190 is wired to compressor sockets 204 of the control station module 101. The 480 voltage power is also provided to external outlets of the connection interface 140 including a fan 134 outlet, a fueling heater outlet 194, a compressor module heater outlet 196, and a motor outlet 198, 120V power outlet 192 and a dryer outlet 202. Lower voltage conduits are provided from the control station module 101 to the external outlets of the connection interface 140 for device controls such as the control room lighting, CSCAN 187, and CATS 186. As shown in FIGS. 3A-3B, the external outlets of the connection interface 140 allow for ready connection to the interface module 124. The connections can be simply plugged in.

FIG. 4C shows the interface connections for the connection from the control station module 101 to an I/O compressor board 150 for the compressor module 120. Remote I/O, all transducers and digital out to relays are controlled by the smart block I/O compressor boards 150. Lower voltage conduits are provided from the control station module 101 to the compressor module 120 via low voltage device control 191 such as the control room lighting, CSCAN 187 and CATS 186. In an embodiment, as shown in FIG. 4C, the 480 volt power control 190 is wired from the compressor sockets 204 of the connection interface 140 of the control station module 101 to the compressor module 120 compressor boards 150. The compressor boards 150 for each compressor 136 are mounted on a compressor panel in the compressor module 120. Accordingly, only a single control operation (CSCAN) needs to be run from the controller 181 to the smart block of the I/O compressor board 150.

Figure 5A:
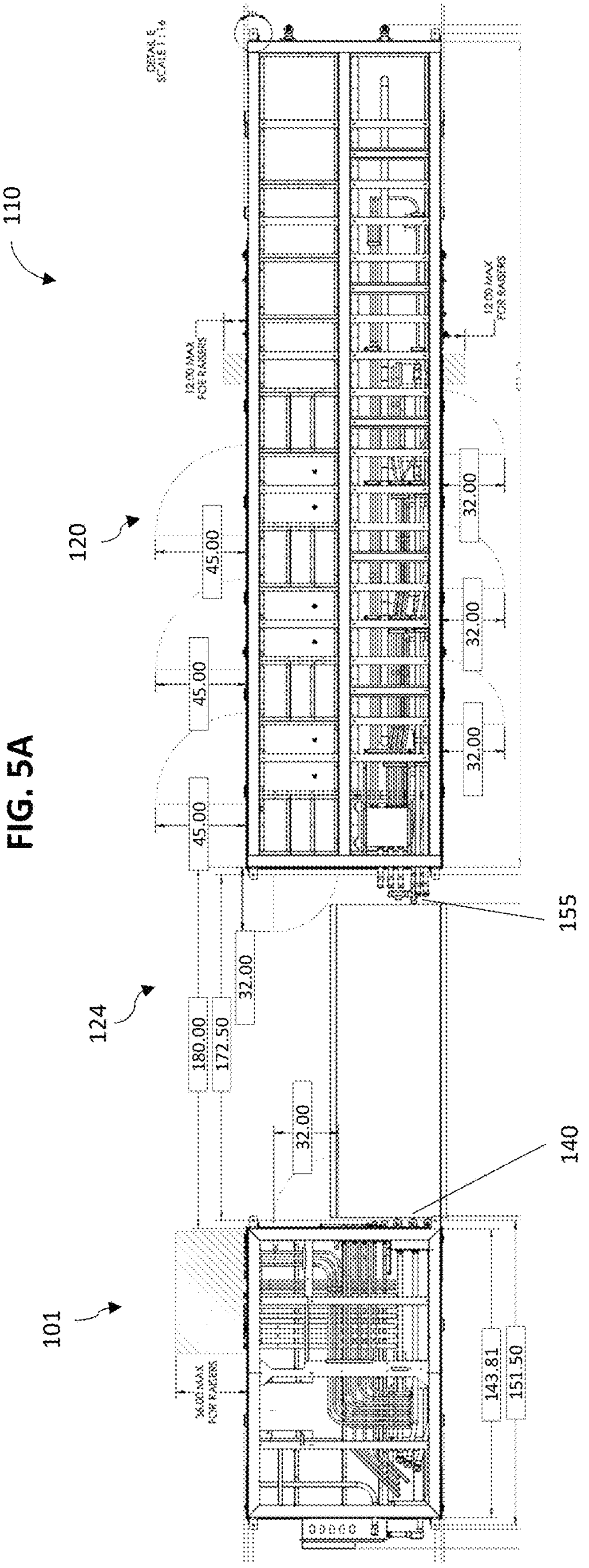
FIGS. 5A-5C show a plan bottom view and a cutaway for the control station module and the compressor module.
Figure 5B:
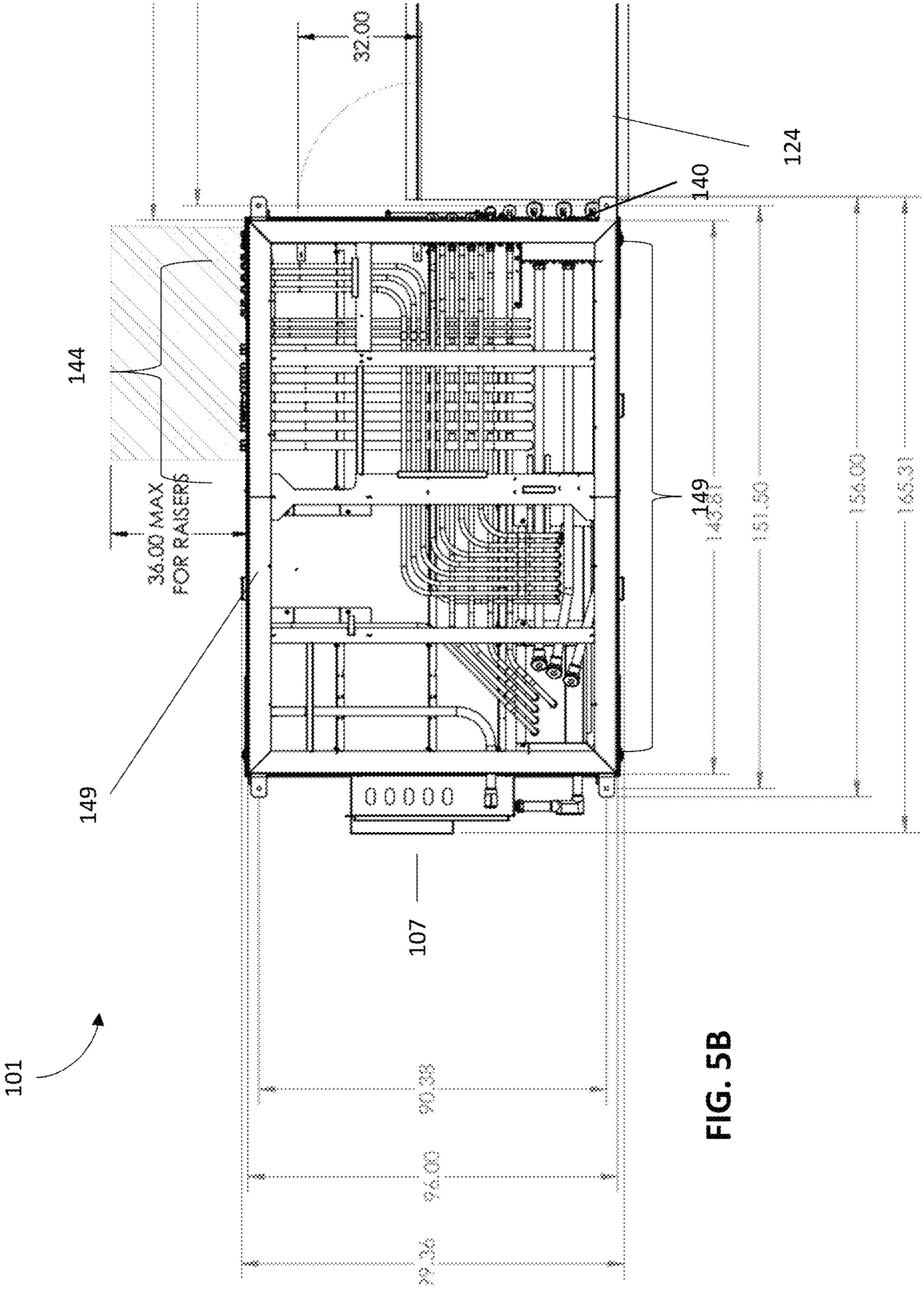
Figure 5C:
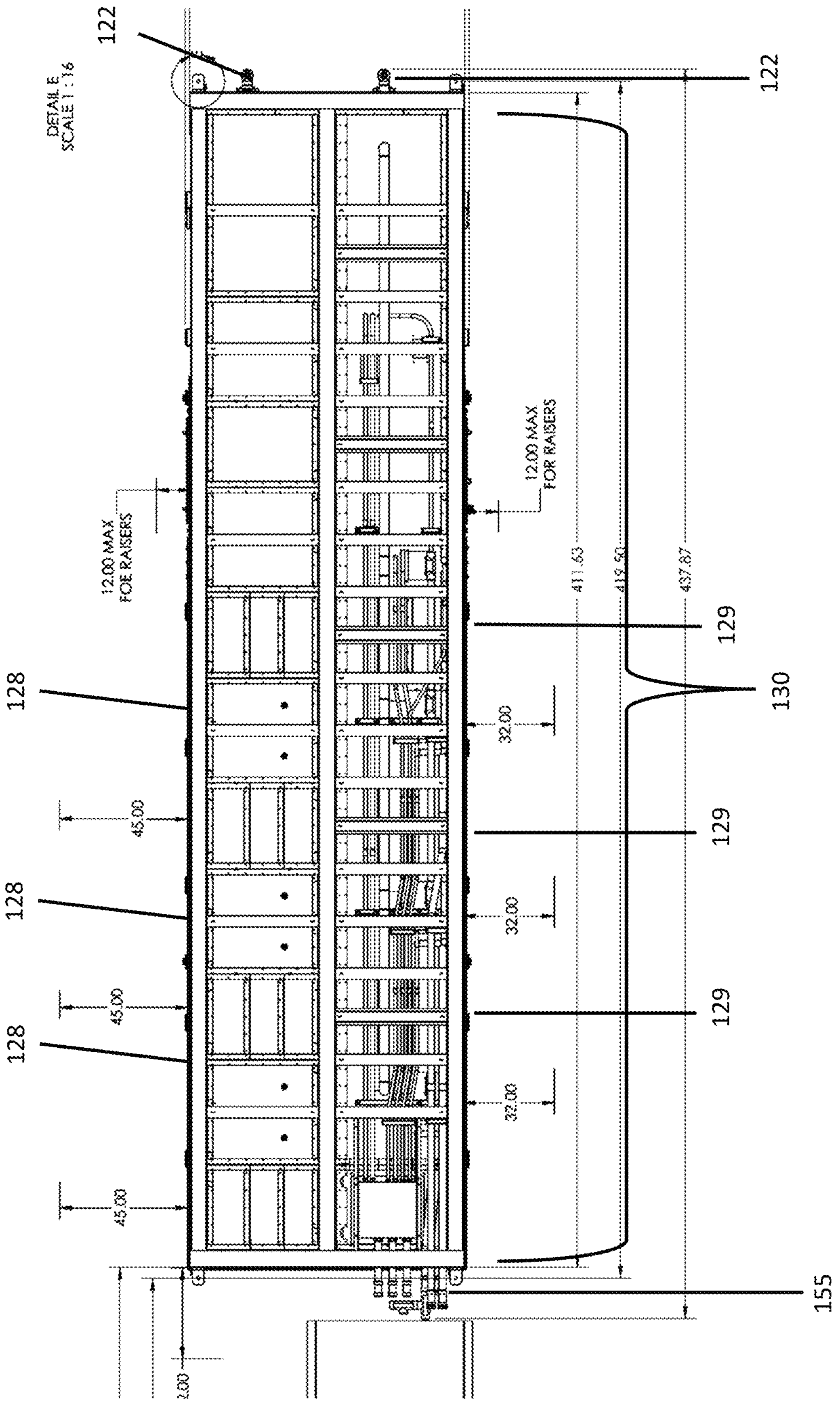

As shown in FIGS. 5A-5C, in an embodiment, the control station module 101, the interface module 124 and the compressor module 120 are each pre-plumbed with electrical connections to allow the CFS station 100 to be portable and easily installed at a utility site. The conduit cables as shown are pre-plumbed in a sub-floor 130 of the compressor module 120 to allow the interface module 124 to easily connect the control station module 101 to the compressor module 120 via the interface module 124. The interface module 124 cables and the enclosure are pre-configured and safety rated as a "plug and play" component of the CNG station 100.

FIGS. 5A-5C show a plan bottom view, including a cutaway showing the electrical conduits in a sub-floor 149 of the control station module 101 and a sub-floor of 130 of the compressor module 120. As shown in FIG. 5B, control station module 101 includes a sub-floor 149 that includes the connection conduits that connect via a connection interface 140 to the interface module 124. The control station module 101 also includes external connections 144 for the electrical wiring to sockets 105 on the exterior of the control room 109 for running external devices, such as the truss lighting and a site heater.

The interface module 124 encases connecting cables that are pre-wired to connect to the connection interface 140 of the control station module 101 and a connection interface 155 of the compressor module 120. The interface module 124 comprises a plurality of flexible cables housed in the interface module 124 enclosure. For example, in an embodiment, the interface module 124 can have 10 flexible Meltric connectors (not shown), which can be connected to the external connections of the control station module's connection interface 140 and the external connections of the connection interface 155 of the compressor module 120 in as little as 30 minutes. As explained herein, the interface module 124 is configured to be set on the platform 108 above-ground.

Figure 6A:
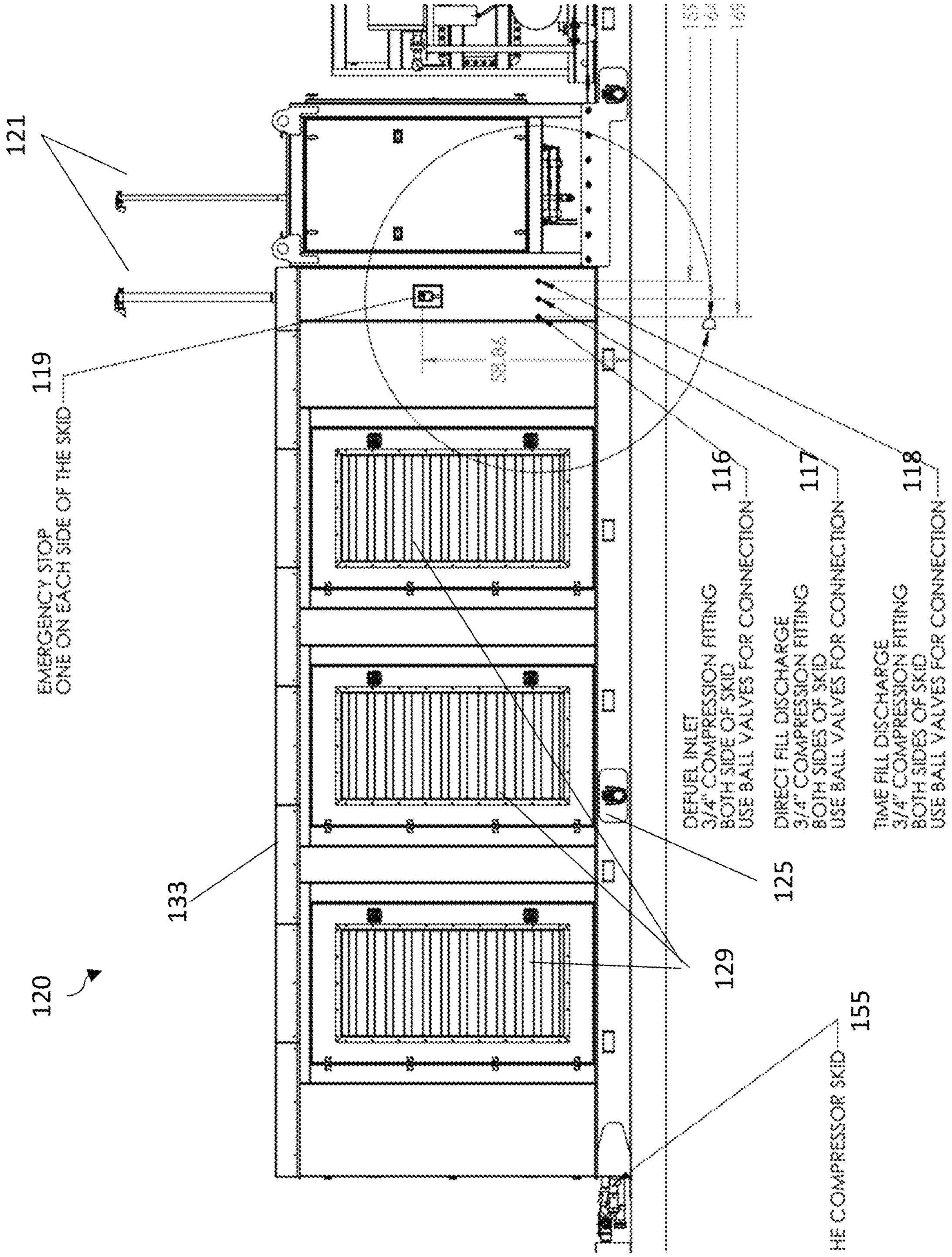
FIGS. 6A-6B show a side exterior view of the compressor module of FIGS. 1A-1B.
Figure 6B:
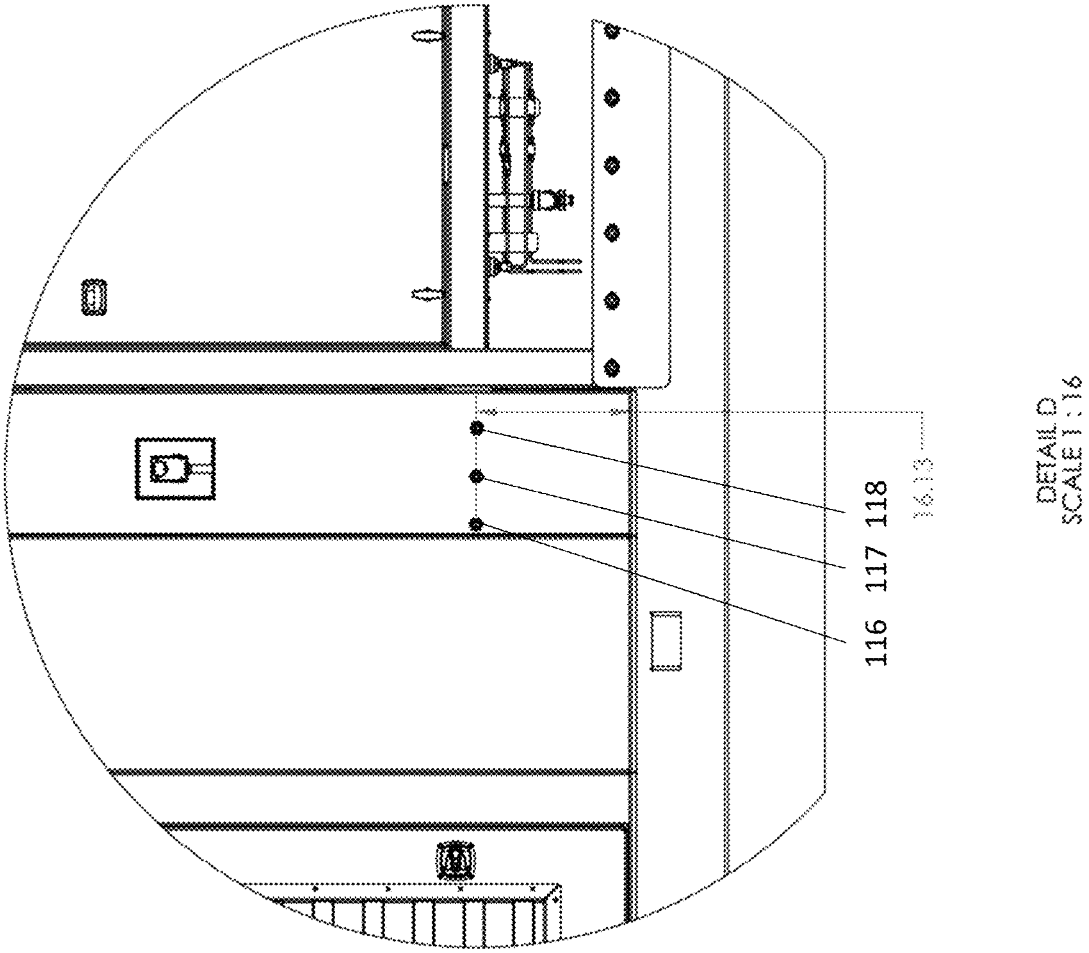
Figure 6C:
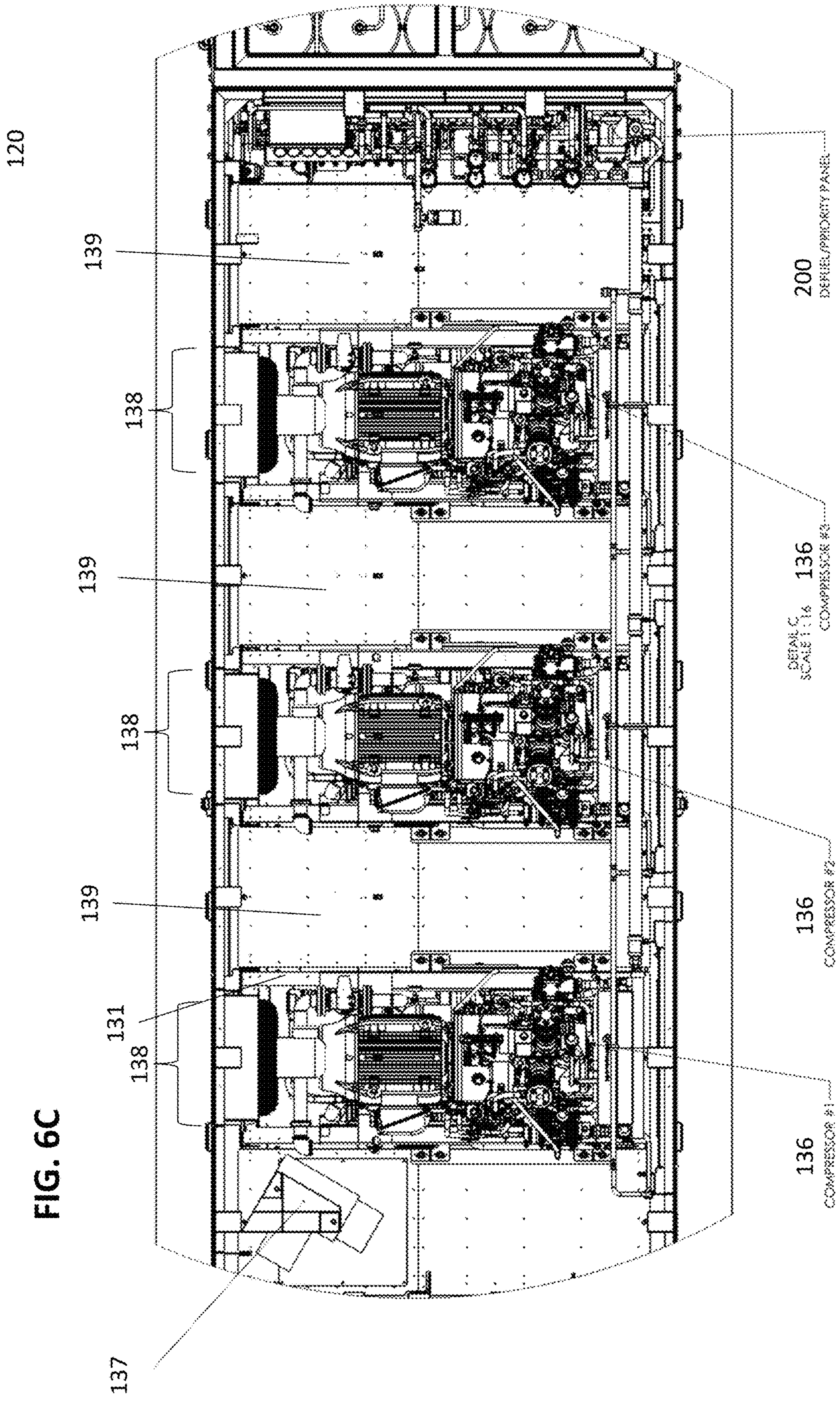
FIG. 6C shows a cutaway top plan view of the compressor module of FIG. 1C.

In an embodiment, FIGS. 6A-6B show a side exterior view of a compressor module 120. FIG. 6C shows a cutaway top plan view of the compressor module 120. The compressor module 120 includes a housing 133 configured to hold a plurality of compressors 136. The compression module includes larger 45" doors 129 at each compressor station for adding and removing compressors. The compressor module 120 is thereby configured so compressors 136 can be added to scale up for fueling additional vehicles or fleets. So, for example, a compressor module 120 as shown can be have from 1 to 3 compressors 136. The compressor module 120 is set up on risers 125. Risers 125 can be sized to allow for easy access by service doors, shown as 32 inch service doors. The control station module 101 includes a ground connection component 115 for affixing the compression module 120 to the platform 108. In an embodiment, the control station module 101 includes 4 ground connection components 115 at each corner of the bottom of the compressor module 120.

The compressor module 120 of the portable CNG station 100 includes an open floor plan with conduits in a sub-floor 130 and removable compressor units 136. As shown in FIG. 6B, the compressor module 120 is configured with service walkways 139 to allow service technicians to easily access the compressors 136. The compressors 136 are placed on a simple frame 131 and are suspended above control components and plumbing for the compressor 136 (e.g., suspended about 3 feet). Notably, the compressor 136 and compressor electrical and plumbing components (e.g. regulator, ESD valve, receiver tanks, filtration) are provided together as a modular compressor unit 138, as opposed to conventional systems where the compressor 136 and the electrical and plumbing components are distributed separately in the installation. Each compressor unit 138 can thus be easily installed or removed, and each compressor 136 can run independently, as shown by the wiring diagrams of FIGS. 4A-5C. As shown in FIG. 5C, the compressor units 138 can be installed via large doors 128 on the side of the housing of the compressor module 120.

An exemplary advantage of a plurality of individually independent compressors 136 includes the ability to isolate compressor units 138, thus allowing continued operation if a compressor 136 stops operation or needs service. Accordingly, the compressor module 120 and the compressor units 138 also have a "plug and play" design that allows for easy installation and deinstallation of the compressors 136 as well as easy service.

As shown in FIGS. 5C-6A, the connection interface 155 of the compressor module 120 is configured to connect the compressor conduits and other electrical conduits to the interface module 124. Thus again, the compressor module 120 design is configured to allow for "plug and play" operability for each of the compressors 136. As shown in FIG. 5C, the compressor units' 138 electrical components are connected to conduits pre-plumbed in the sub floor 130 of the compressor module 120, which are in turn wired to connection interface 155 of the compressor module 120. As noted above, the interface module 124 comprises a plurality of flexible cables housed in the interface module 124 enclosure, which can be connected to the external connections of the control station module's connection interface 140 and the external connections of the connection interface 155 of the compressor module 120 in as little as 30 minutes.

Figure 7A:
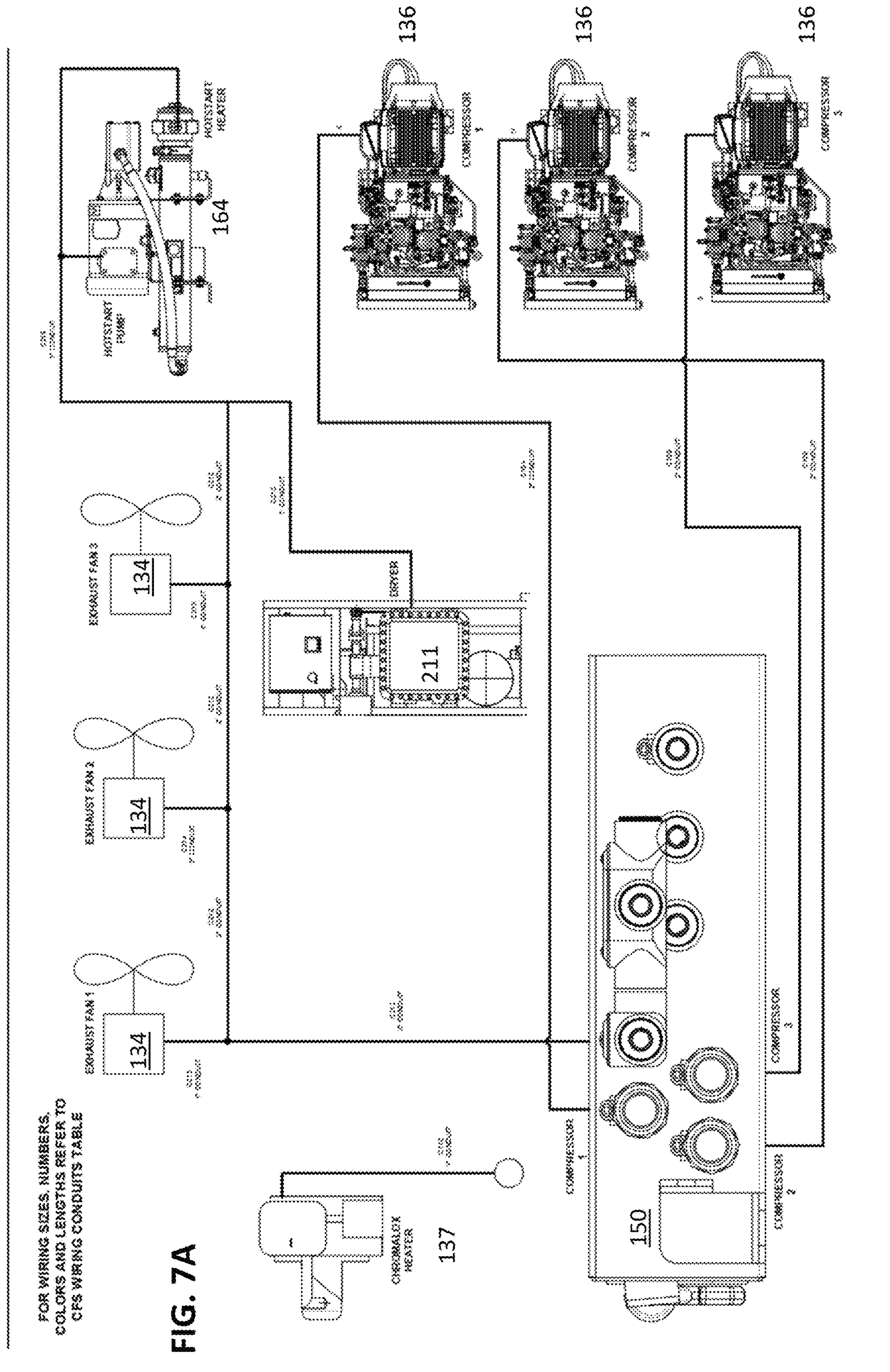
FIGS. 7A-7B show wiring diagrams for a compressor module.
Figure 7B:
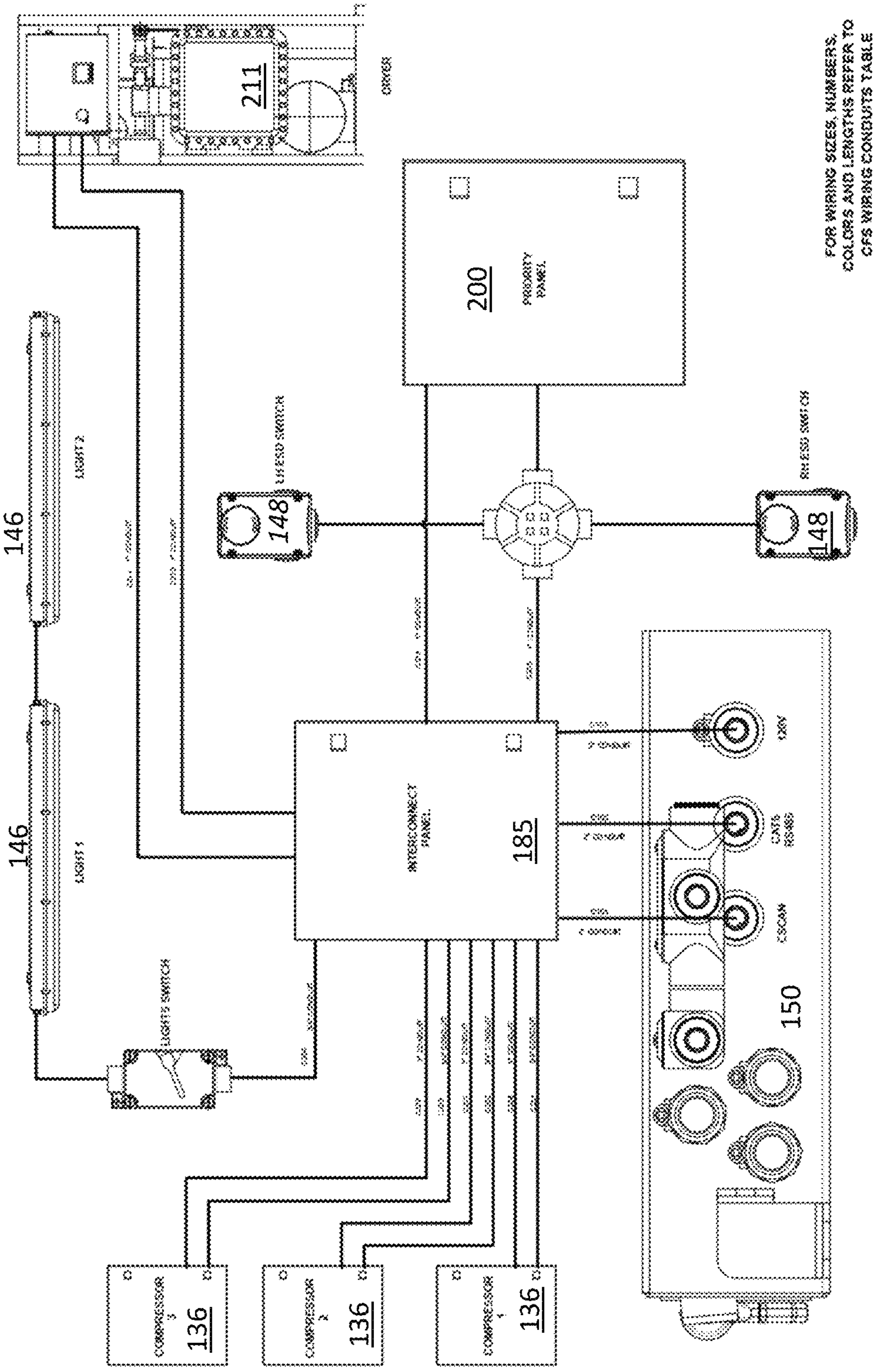

FIGS. 7A-7B show wiring diagrams for a compressor module 120. As shown in FIGS. 7A-7B, the compressor module 120 can be provided with a heater 137 for cold-weather operation as well as a series of exhaust fans 134. As described above, power is provided to the I/O compressor boards 150 as described above with respect to FIGS. 4B-4C. As shown in FIG. 7A, the compressor module 120 also includes a dryer 211 configured to make sure no moisture is in gas from the utility. The compressor module also includes glycol heater 164 for a defuel priority panel system. In an embodiment, the size of the enclosure of the compressor module 120 can be reduced by mounting the dryer 211 outside. The smaller enclosure in turn reduces the amount of heating and exhaust needed, thus heater and fan sizes can also be reduced. In an embodiment, the enclosure can be insulated to reduce noise and improve heating and cooling. Accordingly, the compressor module 120 enclosure is configured to improve cooling, heating, and protection from water intrusion.

The CNG station 100 also includes a fueling station module 110 and a priority panel 200. A priority panel is a valving system and control configured to direct fill a vehicle or time fill multiple vehicles at the same time as well as connect a dispenser to a utility natural gas provider for public fueling of vehicles with CNG. In an embodiment, as shown in FIGS. 8A-9B, the fueling station 110 includes a defuel priority panel 200, which is configured to defuel, store, and provide fuel from defueled CNG vehicles. In another embodiment (not shown), the fueling station does not include defueling capability or storage tanks 201, but does run conventional priority panel fueling functions (e.g. time fill, direct fill).

As shown in FIG. 4B, communication connection conduits are run from the motor control power panel 190 of the control station module 101 to each compressor 136 via connection interface 140, which includes control signal 187 controls from the control panel 180. As shown in FIG. 7B, the CNG station 100 compressor module 120 comprises an I/O interconnect panel 185 to connect the priority panel 200, the I/O compressor board 150, the compressors 136, the dryer 211, the control room lighting 146 and a light switch 147, the right hand ESD switch 148 and the left hand EDS switch 148.

An I/O compressor board 150 is run to the I/O interconnect panel 185 to control each compressor 136. To reduce wiring, the I/O compressor board 150 at the compressor module 120 is connected to I/O interconnect panel 185 for communication with the control panel 180 (see FIG. 4B). This provides an advantage over conventional permanent installations, where communications are hard wired from the compressor sensors to a control board's control room, requiring communication cabling for each sensor.

In an embodiment, the I/O interconnect panel 185 is configured to centralize sensor signals from the compressors 136, the lighting 146, the dryer 211, the priority panel 200, and the ESD switches 148. The I/O controls 185 can communicate with the control panel 180 to allow a reduction in conduit connections. As shown in FIG. 7B and FIG. 4B, the CFS station 100 wiring is configured to connect C-Scan 186 and Cat-5 187 communication cables into interconnect panel 185, which in turn communicates with the compressors 136, priority panel 200, and low voltage interfaces of the I/O compressor board 150.

It was appreciated that in order to provide a remote CFS control panel 185 that could fuel vehicle fleets of 10-20 vehicles and upward, conventionally, fixed connections between a control module 101 and a compressor module 120 would have required up to 7-8 conduits per compressor. The I/O control panel 185 reduces over 20 conduits and wiring structures—over a mile of wiring—thus allowing for portability and simplified "plug and play" configuration for the CFS station 100 as described herein.

Figure 8A:
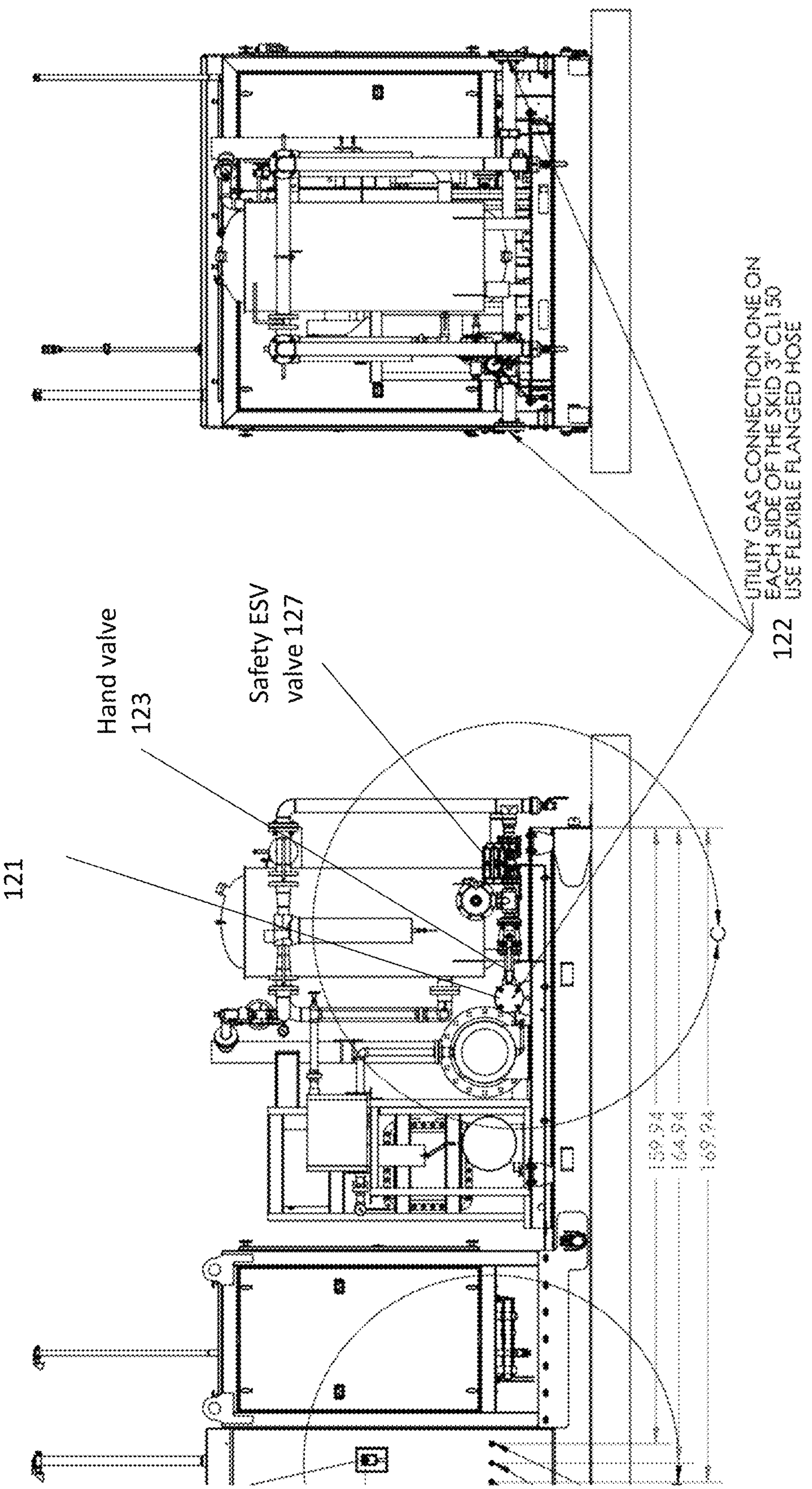
FIGS. 8A-8C show views of the fueling station module of FIGS. 1A-1B.

As shown in FIG. 8A, the fueling station module includes a main regulator 121, a hand valve 123, and an ESV safety valve 127. The fueling station module also includes an inlet connection 122 for accepting gas from the utility gas station. In an embodiment, the fueling station module 110 includes inlet connections 122 for accepting gas from the utility gas station on each side of the fueling station module. As the CNG station 100 is portable, having inlets 122 on each side of the fueling station module allows for connection to the utility gas station regardless of where a site for the CNG station 100 is with respect to the utility.

Figure 8B:
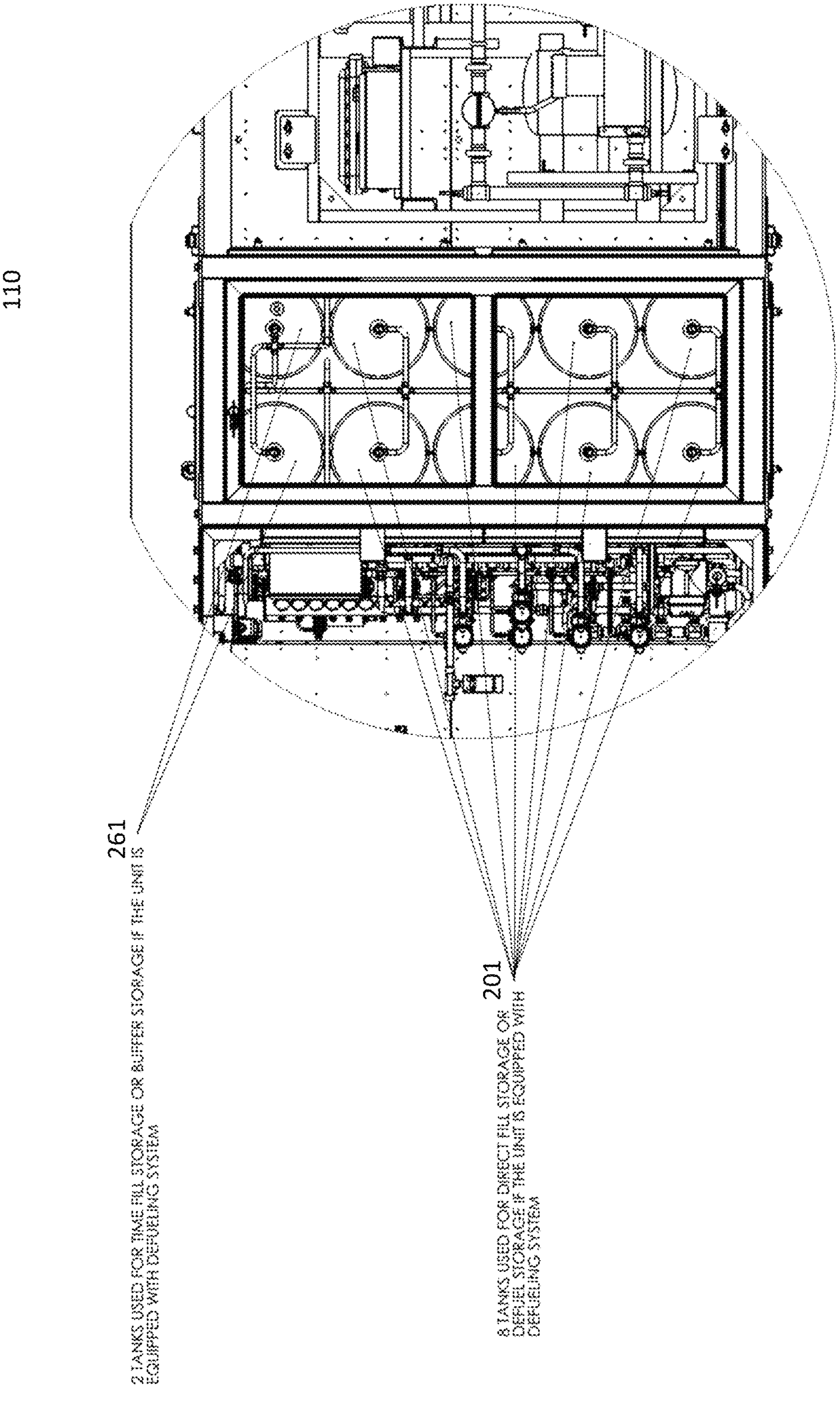

If defueling capability is included, the fueling station module 110 can also include defuel storage tanks 201 for time fill, direct fill, and defueling and a buffer storage tank 261. For example, as shown in FIG. 8B, if defueling capability is included, the station can include 10 storage tanks, where two tanks 261 can be used for time fill storage or buffer storage, and the remaining 8 tanks 201 can be used for direct fill storage. As will be appreciated, if no defuel capability is provided, the fueling station module can be provided without storage tanks, as gas will be provided by the utility, and any excess gas can be vented, as is the case with conventional priority panels.

Figure 8C:
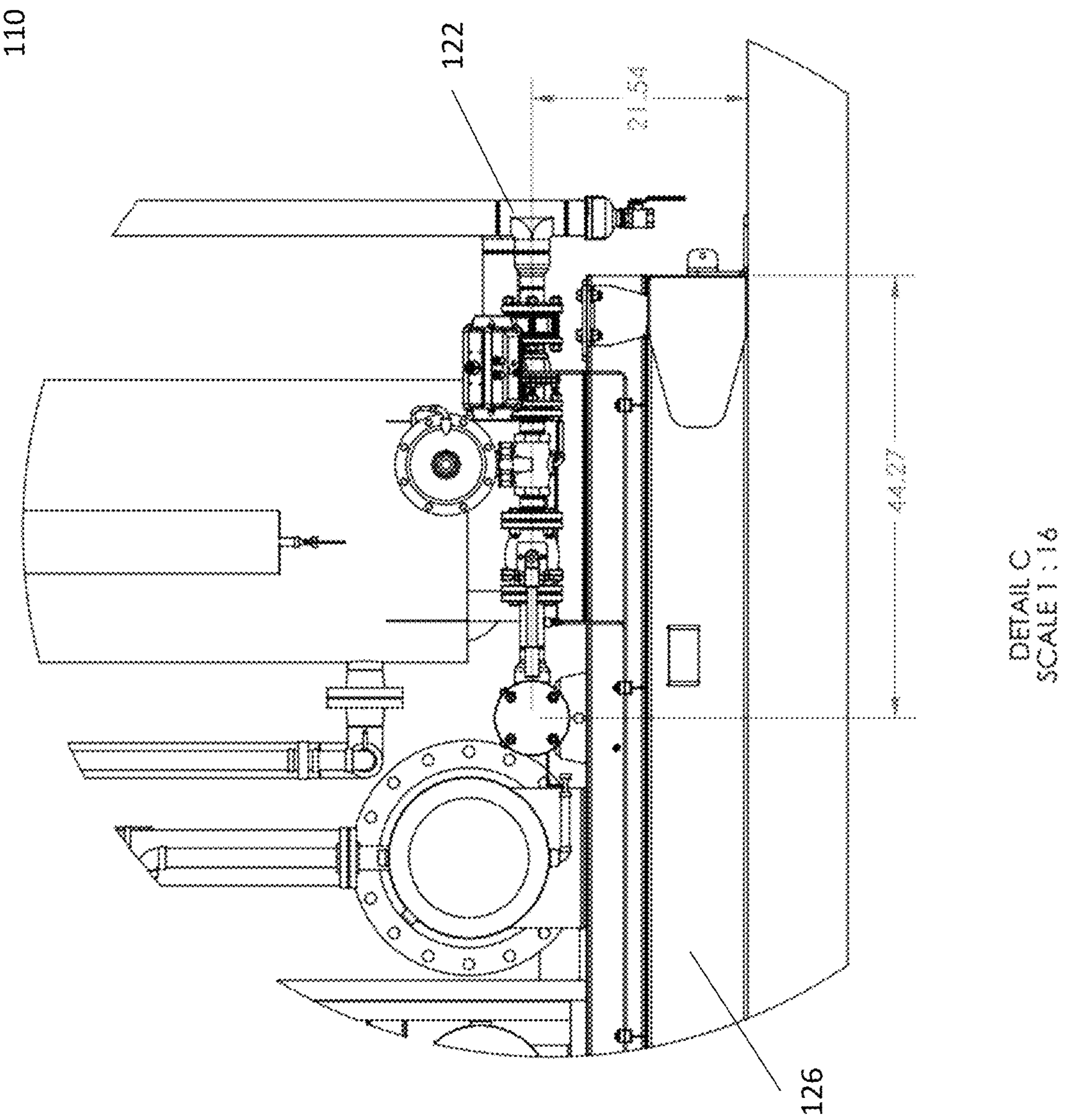

As shown in FIG. 8C, the fueling station module 110 is placed on risers 126, which house a floor for providing connections to the compressor module 120. In an embodiment, the utility gas connection 122 is set about 22 inches above the platform 108 for easy access. Utility gas connectors 122 are pre-plumbed such that the utility gas can be connected from either side of the fueling station module 110. The main regulator 121, safety ESV 127, and manual hand valve 123 are also pre-plumbed, and do not need to be constructed on site. Similarly, a dryer 211 is pre-installed and wired, and does not need to be separately and permanently installed. In an embodiment, the system can include simplified lock out tagging out with valve locations, easy access blow downs, color coded handles and accessible drain valves.

Figure 9A:
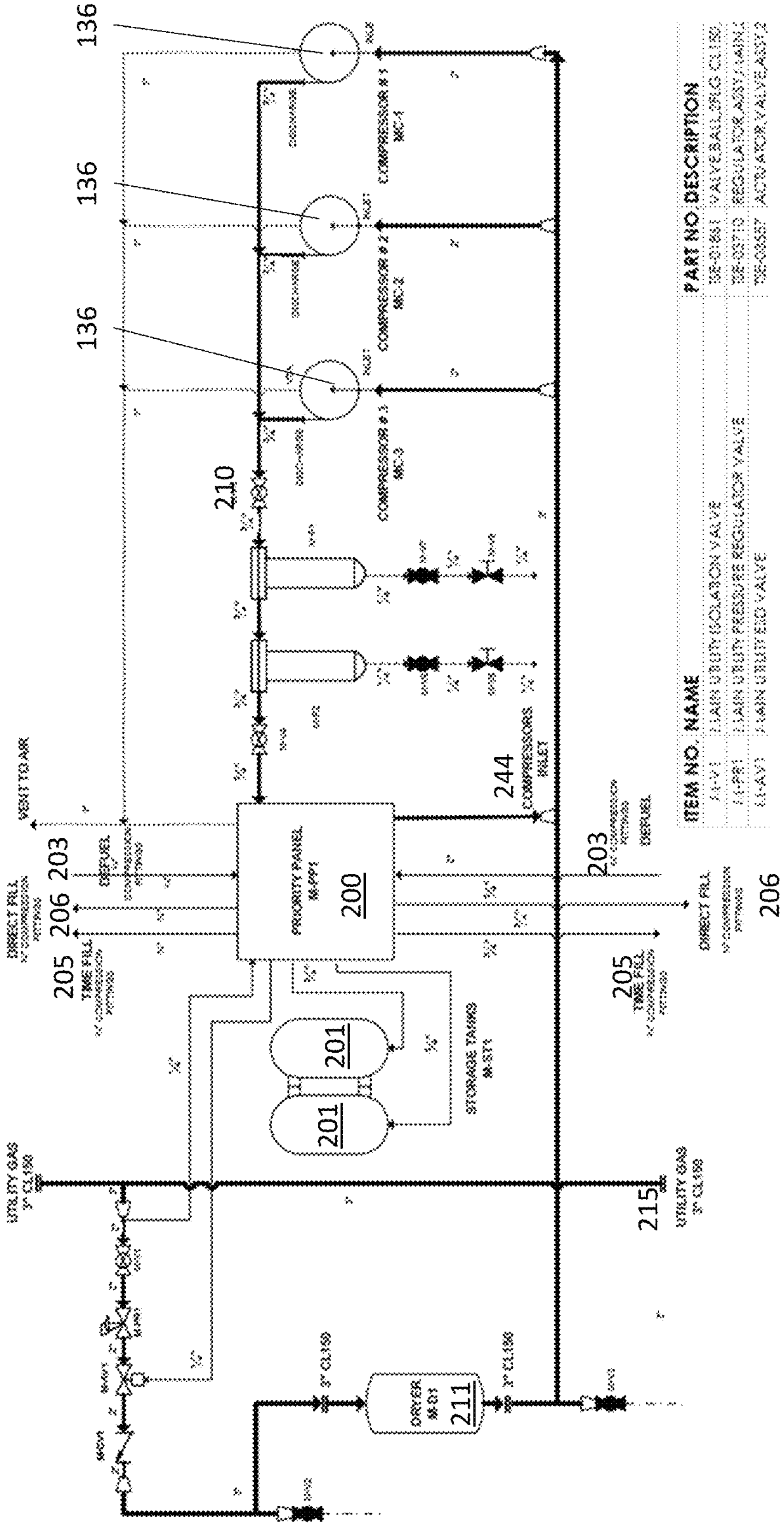
FIGS. 9A-9C shows a valving and gas flow for a fueling station module.
Figure 9B:
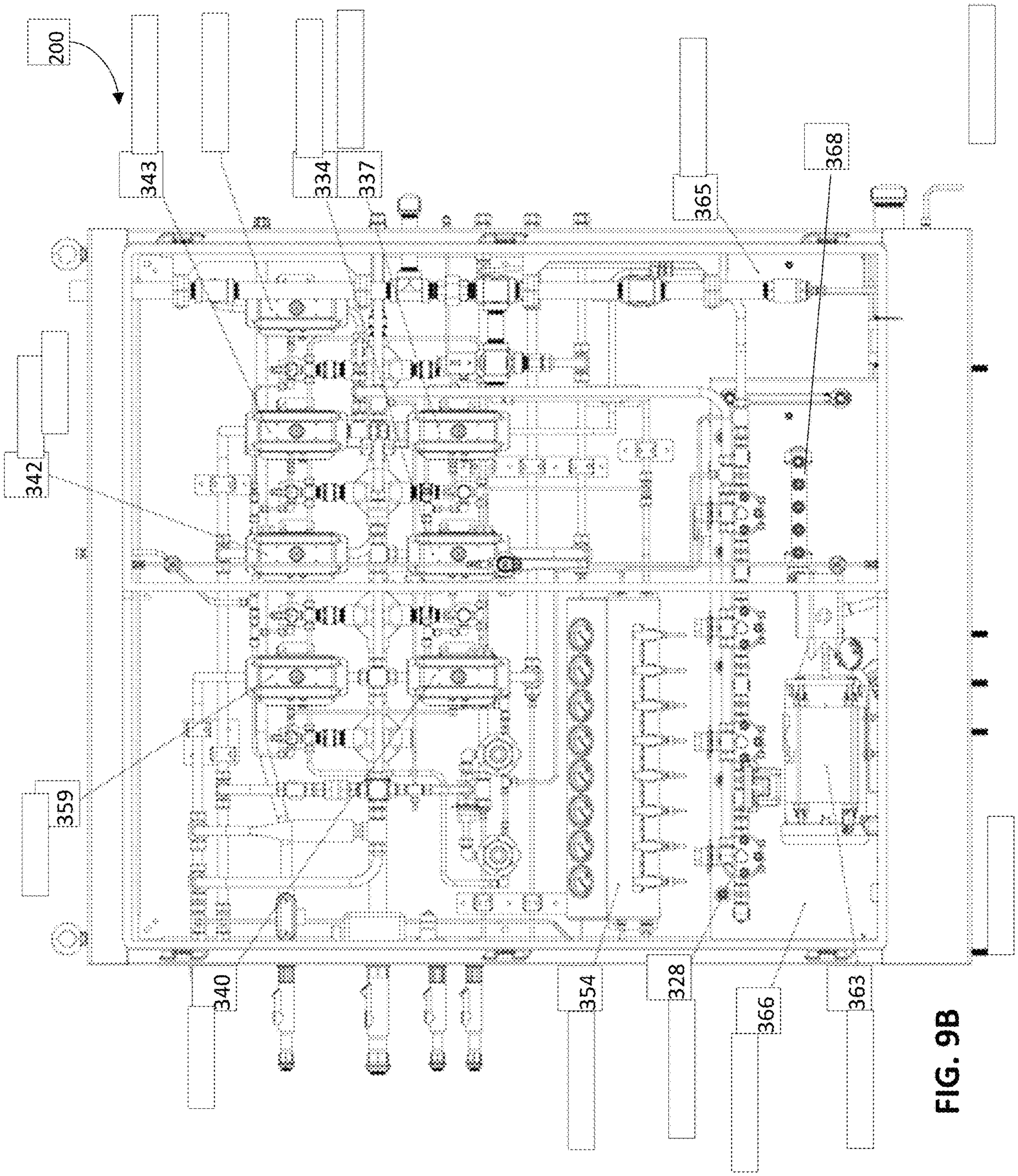
Figure 9C:
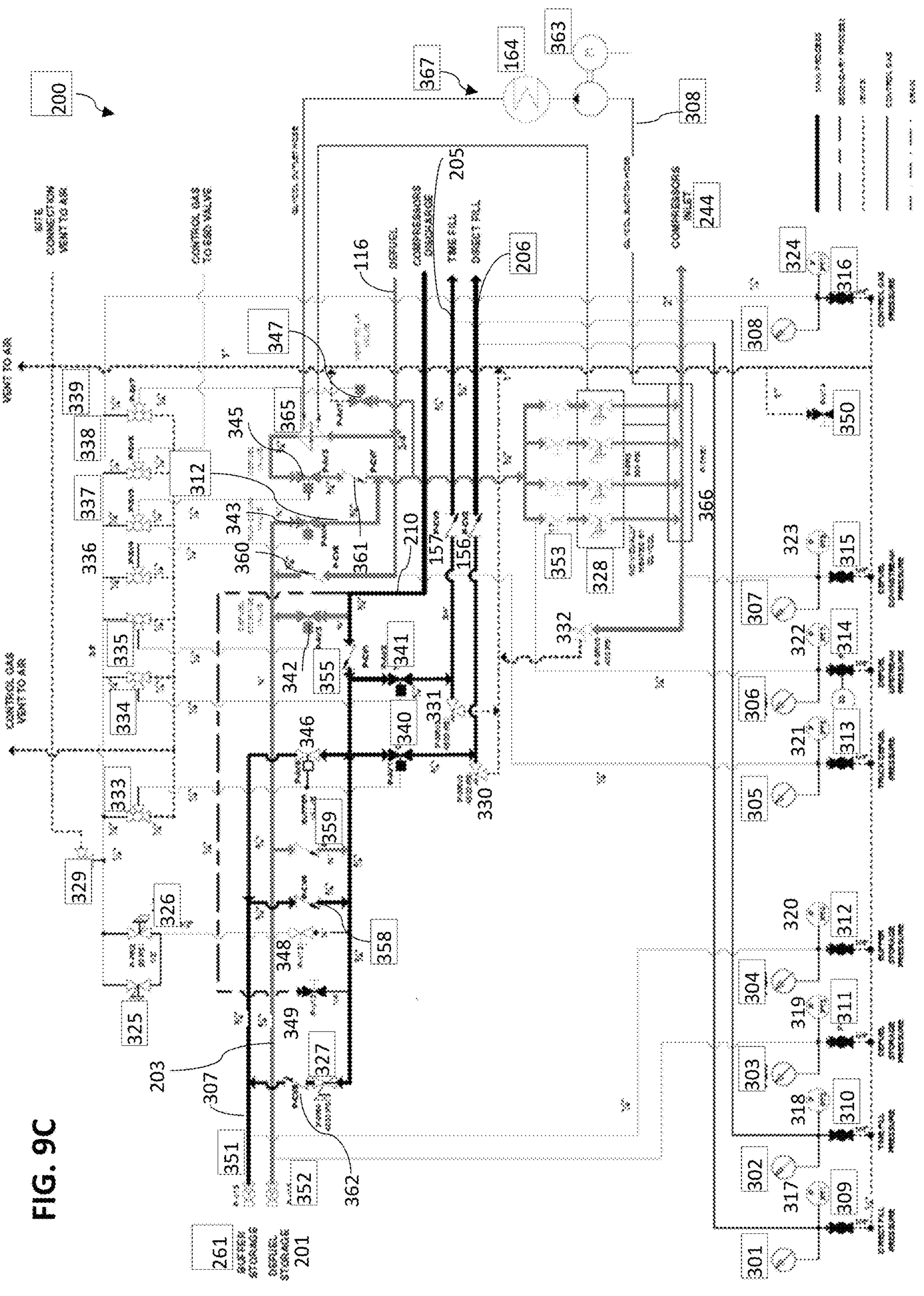

FIGS. 9A-9C shows a valve and gas flow for a fueling station module 110 including a defuel priority panel 200. The Priority/Defuel panel is a valve panel 200 and an automated system for controlling gas flow via automated valves, which can be controlled by control panel 180.

The system comprises a plurality of CNG storage tanks 201 in an enclosed rack. In an embodiment, the system comprises dedicated defueling storage tanks 201 for defueling and dedicated buffer storage vessels 261 for direct filling.

The Priority/Defuel panel 200 and the fueling station 110 module is configured to direct fill a vehicle, time fill multiple vehicles at the same time, and connect dispensing outlets 116,117,118 for public fueling and defueling vehicles. Priority fueling prioritizes which type of fueling needs to take place between a direct fill and a time fill for vehicle fueling. Direct fill refers to a dedicated fill where a single vehicle or fuel tanks therefor are filled at higher priority. Time fill refers to a time regulated fill where CNG is delivered to a fleet of vehicles over time (e.g. 30-40 trucks). In an embodiment, the system is configured to pull utility gas from a utility gas station via a utility gas line 215 and route the gas through a dryer 211 to an available compressor 136 on a compressed gas line 210. The compressed gas sent is then filtered by a set of final discharge filters and sent to the priority panel 200 via a compressed gas line 210. The priority panel 200 then prioritizes the CNG for the direct fill outlet 117 via a direct fill line 206 for direct filling a vehicle or for the time fill outlet 118 via the time fill line 205 for time filling multiple vehicles. As shown in FIG. 9A, the direct fill line 206 to the direct fill outlet 117 and the time fill line 205 to the time fill outlet 118 are provided on each side of the fueling station module 110 for ease of access by vehicles on either side of the CNG station 100.

In an embodiment, the priority panel 200 can be configured to only provide direct fill and time fill, and not provide defuel capability. If defuel capability is provided, the fueling station module 110 is configured with a defuel inlet 116 to defuel a vehicle of CNG, compress the defueled CNG, and store the compressed CNG in a defuel storage tank 261. A defuel priority panel is and the CNG flows described in U.S. Provisional Patent Application No. 62/873,667 entitled Defuel Priority Panel, filed on Jul. 12, 2019, the entirety of which is incorporated by reference herein. As described therein, the priority panel 200 can be a standalone component, however the priority panel 200 can also be configured to be incorporated into the present portable CFS station 100 as described herein. A defuel priority panel 200 is configured to route defueled gas from a defueling vehicle via a defuel line 203 to a fueling direct fill vehicle or fueling time fill vehicles. When defueling gas pressure equalizes in the system, the defuel priority panel is configured to route the defueled gas to a compressor inlet 244 and the compressed gas line 210 to an available compressor 136 to compress the gas to a fueling vehicle or storage tank 201. The fueling station module 110 is also provided with a vent line 207 to vent CNG, for example if the storage tanks are full and a vehicle is still defueling, or if the CNG needs to be vented for service.

In an embodiment, a CNG vehicle can be connected to a remote mounted defuel hose (not shown) that is plumbed to the Priority/Defuel panel via a defuel inlet 116. In an embodiment, once connected, the Defuel/Priority system can be fully automated. The system is configured with a defuel line pressure transducer 321 that senses the pressure increase on the defuel line 203. That pressure increase on the defuel line 203 starts a chain of events controlled by a PLC controller 180.

First, the controller 180 activates a heat exchange system 367 configured to prevent freezing during the defuel process. In an embodiment, the heat exchange system comprises a three-stage heat and pressure regulator(s). The heat exchange system 367 comprises a glycol pump 363 and glycol heater 164. The glycol pump 363 pulls glycol from a storage tank 366, through an instant inline heater 364. This glycol is instantly heated to 180 degrees. The heated glycol is first pushed through a high-pressure heat exchanger 365. This heat exchanger 365 is configured to preheat the incoming gas entering the valve panel, which enters the system from up to 4500 psi, depending on the vehicle pressure. After the heat exchanger 365, the gas travels through a defuel valve 345 and to a manifold 368 to corresponding glycol defuel pressure regulators 328. A glycol exit of the heat exchanger 365 feeds a manifold 168 that distributes glycol to the manifold comprising defueling pressure regulators 328.

The pressure regulators 328 are preconfigured to transfer fuel at a static rate as well as to have heat applied to counteract the freezing that happens from the pressure drop. For example, the pressure reducing valves of the defuel pressure regulators 328 can depressurize fuel at 100 cubic standard feet per minute (scfm) each and are each individually heated by the glycol pump. The defuel pressure regulators 328 drop the fuel pressure from the vehicle to a set low pressure, for example from 4200 psi to 250-300 psi into a manifold, which is located inside the glycol storage tank 366. As will be appreciated, while high and low tank and defuel pressures are given with respect to exemplary CNG vehicles and vehicle tanks (e.g. 4200 psi to 250-300 psi), the defuel pressure regulators can be set to depressurize for other higher and lower pressures. After the glycol is distributed to the defuel pressure regulators 328, the glycol returns to the storage tank 366. The storage tank 366 also acts the final heat exchanger for the defuel gas system. This is the final stage of heat exchange for the gas as it travels back out of the panel and into the utility gas compressor inlet 244 of the compressor(s) 136. Accordingly, the glycol heat exchange system 367 is a loop system, thus the glycol can always be reused, reheated and sent back through the heat exchange process. As will be appreciated, the defuel pressure regulators 328 can be set to any low pressure setting to defuel from a high pressure to a low pressure. For example, a given vehicle's tank operation can require 300 psi to operate, so the system is configured to regulate the pressure to 300 psi. In another embodiment, the system can be configured to set to 250 psi, for example, to obtain more fuel efficiency or other benefits.

As a result, the system is configured to defuel gas from a vehicle tank back into the utility compressor inlet line 244 of the compressor(s) 136 so it can be reused. A glycol suction hose 308 and pump 363 picks up cold glycol solution at bottom of the tank and reheats it for further heat exchange during rapid depressurization. Although glycol is given as an exemplary heat exchange liquid herein, other liquids with antifreeze and heat exchange properties can be employed in the heat exchange system 367. Also, although the heat exchange system 367 is shown as a three-stage system, the heat exchange system could be configured as more or less stages, a two-stage or one stage system, for example, by removing one or both of the pre-heat exchanger 365 and the heat exchanger 366 at the storage tank. Or, another heat exchanger could be added, for example, to handle a larger depressurization differential over a short period of time.

During this time, the controller commands the compressor 136 to run. If the compressor is already running, filling time fill or direct fill, the defueled gas is directed toward the demand already in place. If there is no demand on the system, the compressor is commanded to run and the defuel vehicle gas is compressed into the onboard defuel storage tank(s) 201. The compressors will continue to run until the defuel vehicle is down to a User Set Point, for example 250 psi-300 psi. The controller 180 can be configured to automatically shut down the compressor if it is no longer otherwise needed.

In an embodiment, the Defuel/Priority panel system 200 is configured to depressurize fuel stored by the system in the defuel storage tanks 201, referred to as a storage run down. Any time there is a demand for fuel, the controller 180 can be configured to determine if there is fuel available in the defuel storage tank 201 first. As an example, if time fill is active, and the defuel storage tank 201 has fuel or is full of fuel, the system 200 can be configured to use fuel from the defuel storage tank 201 first. Thus, the system can be configured so that the storage vessels 201 are empty for the next vehicle to be defueled. To do this, each time there is demand on the system and the defuel storage tank 201 is full or has fuel, a run down valve 343 opens. This allows gas from defuel storage tank 201 to flow through the defuel regulators 328 once again. This takes the high pressure CNG from the defuel storage tanks and regulates it down to 250-300 psi to be reused into the compressor inlet 244. A defuel valve 345 is closed and the gas returns along the same path in the opposite direction on the defuel line 203 that a defueled vehicle gas takes during a defuel event to run down (i.e. defuel) the defuel storage tank(s) 201 for use by the fuel demand source.

In an embodiment, the system can be configured as an "all in one" system with on board storage or external remote mounted storage. The defuel station is configured to combat the freezing effect of defueling gas and that is used to defuel vehicle gas via a priority system to a direct flow per demand.

Accordingly, the defuel priority panel 200 can be configured to prioritize defueled gas from a vehicle or a storage tank over utility gas. This provides great advantages in both environmental safety and efficiency, as most defueled gas is not vented to the air and wasted, but is instead stored and used as fuel. Provision of a defuel priority panel 200 in a portable CNG station 100 allows the delivery and ready installation of such capability in a small, single footprint.

Note the terms "fuel", "gas", "natural gas" and CNG are used interchangeably herein.

In an embodiment, the system includes a control panel 180 as shown in FIG. 4A for the priority defuel panel 100 system and the compressors 136. The control panel 180 includes a computer interface operatively connected to a processor and program memory including instructions to execute the program logic for controlling the devices and gas flows described herein. The embodiments disclosed herein can be practiced using programmable digital computers. A computer device includes at least one processor or microprocessor central processing unit (CPU). In an embodiment, the system is configured to employ one or more Programmable Logic Controllers 180 (PLC) configured with multiple input and output arrangements hardwired to the priority defuel panel 200 system and the compressors 136 as described herein. For example, in an embodiment, the control panel 180 can include Horner™ PLC's and Smart Block I/O interconnect panel 185 configured with analog and digital inputs and outputs. The PLC can be configured to operate with a power supply, for example a 480 v/120 v/24 v control panel 180, to power the CNG station 100 as described herein. Control logic for a control panel 180 is described in U.S. Provisional Patent Application No. 62/873,667 entitled Defuel Priority Panel, filed on Jul. 12, 2019.

The following reference numbers are used on the Figures and description herein:

direct fill pressure gauge 301
time fill pressure gauge 302
defuel storage pressure gauge 303
buffer storage pressure gauge 304
truck defuel pressure gauge 305
defuel upstream pressure gauge 306
defuel manifold pressure gauge 307
control gas pressure gauge 308
direct fill purge valve 309
time fill purge valve 310
defuel storage purge valve 311
buffer storage purge valve 312
vehicle defuel purge valve 313
defuel upstream purge valve 314
defuel manifold purge valve 315
control gas purge valve 316
direct fill pressure transducer 317
time fill pressure transducer 318
defuel storage pressure transducer 319
buffer storage pressure transducer 320
defuel line pressure transducer 321
defuel upstream pressure transducer 322
defuel manifold pressure transducer 323
control gas pressure transducer 324
control gas pressure regulator #1 325
control gas pressure regulator #2 326
back pressure regulator 327
defueling pressure regulator (quantity of 4) 328
control gas safety relief valve 329
direct fill safety relief valve 330
time fill safety relief valve 331
defuel downstream safety relief valve 332
direct fill and buffer storage solenoid valve 333
time fill solenoid valve 334
defuel storage solenoid valve 335
run down solenoid valve 336
defuel solenoid valve 337
ESD solenoid valve 338
defuel vent solenoid valve 339
direct fill valve 340
time fill valve 341
defuel storage valve 342
run down valve 343
defuel valve 345 buffer storage valve 346
defuel vent valve 347
control gas isolation valve 348
control gas bypass valve 349
vent stack drain valve 350
buffer storage isolation valve 351
defuel storage isolation valve 352
defuel regulator isolation valve (qty of 4) 353
Gauge and valve panel 354
main inlet check valve 355
direct fill check valve 356
time fill check valve 357
buffer storage check valve 358
defuel storage check valve 359
defuel hose check valve 360
defuel manifold check valve 361
backpressure check valve 362
glycol pump 363
glycol heater 164
heat exchanger 365
storage tank and heat exchanger 366
a heat exchange system 367
manifold 368
control panel/controller 180
power panel 190
defuel storage tank 201
defuel inlet 116
defuel line 203
compressor inlet 244
time fill line 205
direct fill line 206
buffer storage line 307
glycol suction hose 308
compressor discharge inlet 309
compressed gas line 210
buffer storage tank 261
run down line 212

It will be understood that flowchart illustrations, and combinations of flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

The invention claimed is:

1. A modular compressed natural gas (CNG) fueling station comprising:

a compressor module configured with preinstalled electrical conduits and valving and configured to house a CNG compressor unit for the CNG fueling station, the compressor module comprising a compressor module connection interface component;

an interface module comprising preinstalled electrical conduits configured for connecting to the preinstalled electrical conduits of the compressor module at the compressor module connection interface component to a control module connection interface component to operatively connect the compressor module to a separate control station module including control room and a power source, the interface module comprising a power source input configured to power the modular CNG station from the power source; and a fueling station module comprising a utility gas inlet and operatively connected to the compressor module.

2. The modular CNG station of claim 1 further comprising:

a site platform, wherein the connection interface of the control station module, the interface module, and the connection interface of the compressor module are installed and connected above-ground on the site platform; and the modular CNG station is fully operational when the control station module is connected to a power source and the fueling station module is connected to a CNG fueling source.

3. The modular CNG station of claim 1, wherein the modular CNG station is a length, height and weight to allow it to be transported on a standard semi-tractor-trailer truck or transport truck without the need for special permitting.

4. The modular CNG station of claim 3, wherein the modular CNG station has a weight of about 43,000 pounds or under.

5. The modular CNG station of claim 1, wherein the control station module for controlling the CNG fueling station comprises the control module connection interface component.

6. The modular CNG station of claim 5, wherein the control station module comprising a transformer configured to provide a plurality of different voltages from the power source to differently powered devices of the modular CNG station.

7. The modular CNG station of claim 6, wherein the control station module further comprises:

an interface for powering external devices of the CNG fueling station at a first voltage; and an interface for powering the compressor unit at a second voltage higher than the first voltage.

8. The modular CNG station of claim 7, wherein the control station module further comprises:

an interface for powering the controller at a third voltage lower than the first voltage.

9. The modular CNG station of claim 1, wherein the compressor module further comprises:

a modular compressor unit; and a housing preconfigured with electrical conduits to connect the modular compressor unit to the compressor module connection interface component.

10. The modular CNG station of claim 9, wherein the compressor module further comprises a sub-floor comprising electrical conduits.

11. The modular CNG station of claim 9, wherein the compressor module further comprises:

an I/O compressor board connected to the compressor module connection interface; and an I/O interconnect panel connected to the I/O compressor board.

12. The modular CNG station of claim 11, wherein the control station module further comprises:

a controller operatively connected to the control module connection interface component, wherein the controller is configured to communicate with the I/O compressor board.

13. The modular CNG station of claim 9, wherein the housing for the compressor module is configured to house a plurality of the modular compressor units.

14. The modular CNG station of claim 13, wherein the housing for the compressor module further comprises a plurality of service walkways for each of the plurality of modular compressor units.

15. The modular CNG station of claim 9, wherein the compressor module further comprises:

a priority panel configured to control compressed natural gas flow for the fueling station module.

16. The modular CNG station of claim 15, wherein the compressor module further comprises:

a defuel priority panel system operatively connected to the compressor module.

17. The modular CNG station of claim 16, wherein the fueling station module comprises:

a compressor inlet;

a defuel inlet for connecting to and defueling a pressurized fuel source having a pressure;

a heat exchange system connected to the defuel inlet, wherein the heat exchange system is configured to prevent freezing during defueling;

a pressure regulator; and a defueling storage tank, wherein the pressure regulator is configured to depressurize a compressed gas being defueled from the pressurized fuel source, and wherein the fueling station module comprises either a refueling outlet configured to refuel a fuel demand source with defueled gas, a defuel storage for storing defueled gas, or both.

18. A modular compressed natural gas (CNG) fueling station comprising:

a compressor module configured to house a CNG compressor unit for the CNG fueling station, the compressor module comprising a compressor module connection interface component;

an interface module comprising electrical conduits configured for connecting the compressor module connection interface component to a control module connection interface component to operatively connect the compressor module to a control station module, wherein the interface module comprises an electrically insulated casing enclosing the electrical conduits connecting the compressor module connection interface component to the control station module connection interface, the casing being adapted to allow the electrical conduits to operate above-ground;

a fueling station module comprising a utility gas inlet and operatively connected to the compressor module;

wherein the modular CNG station is configured with preinstalled electrical conduits and valving.

19. A method of installing a modular compressed natural gas (CNG) fueling station comprising:

placing a compressor module configured to house a CNG compressor and comprising a compressor module connection interface component on a CNG station site;

placing a control station module for controlling the CNG fueling station comprising a control module connection interface component on the CNG station site at a site location separate from the compressor module, the control station module comprising control room and a power source configured to power the modular CNG station; and operatively connecting the compressor module to the control station module with an interface module comprising electrical conduits connecting the compressor module connection interface component to the control station module connection interface component;

wherein the compressor module includes a fueling station module.

20. The method of claim 19, wherein the interface module comprises an electrically insulated casing enclosing the electrical conduits connecting the compressor module connection interface component to the control module connection interface component, the casing being adapted to allow the electrical conduits operate above-ground.

21. A method of installing a modular compressed natural gas (CNG) fueling station comprising:

placing a compressor module configured to house a CNG compressor and a compressor module connection interface component on a CNG station site;

placing a control station module for controlling the CNG fueling station comprising a control module connection interface component on the CNG station site; and operatively connecting the compressor module to the control station module with an interface module comprising electrical conduits connecting the compressor module connection interface component to the control module connection interface component;

wherein the compressor module includes a fueling station module and a priority panel configured to control compressed natural gas flow for the fueling station module.

* * * * *